(12) United States Patent
Dudar

(10) Patent No.: US 10,915,104 B2
(45) Date of Patent: Feb. 9, 2021

(54) SYSTEMS AND METHODS FOR MITIGATING SADDLE FUEL TANK JET PUMP FAILURE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 16/113,107

(22) Filed: Aug. 27, 2018

(65) Prior Publication Data

US 2020/0064848 A1 Feb. 27, 2020

(51) Int. Cl.
*G05D 1/02* (2020.01)
*B60K 15/073* (2006.01)
(Continued)

(52) U.S. Cl.
CPC ....... *G05D 1/0212* (2013.01); *B60G 17/0195* (2013.01); *B60K 15/073* (2013.01); *B60K 15/077* (2013.01); *B60W 30/18* (2013.01); *F02M 37/007* (2013.01); *F02M 37/0094* (2013.01); *F02M 37/025* (2013.01); *G01C 21/3469* (2013.01); *G07C 5/02* (2013.01); *B60G 2800/012* (2013.01); *B60K 2015/0325* (2013.01); *B60K 2015/03138* (2013.01);
(Continued)

(58) Field of Classification Search
CPC ......... G05D 1/0212; G05D 2201/0213; B60K 2015/03138; B60K 2015/03144; B60K 2015/03223; B60K 2015/0325; B60K 15/077; B60K 15/073; G07C 5/02; B60G 17/0195; B60G 2800/012; G01C 21/3469; B60W 30/18; F02M 37/025; F02M 37/0094; F02M 37/007
See application file for complete search history.

(56) References Cited

U.S. PATENT DOCUMENTS 6,907,899 B2 6/2005 Yu et al.
7,216,633 B2 5/2007 Attwood et al.
(Continued)

FOREIGN PATENT DOCUMENTS

EP 2653333 A1 * 10/2013 ........... B60K 15/077

OTHER PUBLICATIONS

"Jeep Wrangler Forum—2016 compass calibration question," WranglerForum.com, Available Online at https://www.wranglerforum.com/f202/2016-compass-calibration-question-1748282.html, Available as Early as Jun. 4, 2016, 5 pages.

*Primary Examiner* — Donald J Wallace
(74) *Attorney, Agent, or Firm* — Geoffrey Brumbaugh; McCoy Russell LLP

(57) ABSTRACT

Methods and systems are provided for enabling a vehicle for which a jet pump that functions to transfer fuel from a passive side to an active side of a saddle fuel tank is degraded, to reach a desired destination by the taking of mitigating action. The mitigating action includes conducting a driving maneuver in response to an indication that the jet pump is degraded, the driving maneuver conducted in order to transfer a desired amount of fuel from the passive side to the active side. In this way, a vehicle may reach a desired destination even under circumstances where the vehicle may otherwise be unable to reach the desired destination.

20 Claims, 9 Drawing Sheets

(51) Int. Cl.
*G07C 5/02* (2006.01)
*B60G 17/0195* (2006.01)
*G01C 21/34* (2006.01)
*B60W 30/18* (2012.01)
*F02M 37/02* (2006.01)
*F02M 37/00* (2006.01)
*B60K 15/077* (2006.01)
*B60K 15/03* (2006.01)

(52) U.S. Cl.
CPC ............... *B60K 2015/03144* (2013.01); *B60K 2015/03223* (2013.01); *G05D 2201/0213* (2013.01)

(56) References Cited

U.S. PATENT DOCUMENTS

| | | | |
|---|---|---|---|
| 8,374,781 B2 | 2/2013 | Hartman | |
| 2017/0130680 A1 | 5/2017 | Dudar et al. | |
| 2018/0162353 A1* | 6/2018 | Dudar | ............ F04F 5/24 |

* cited by examiner

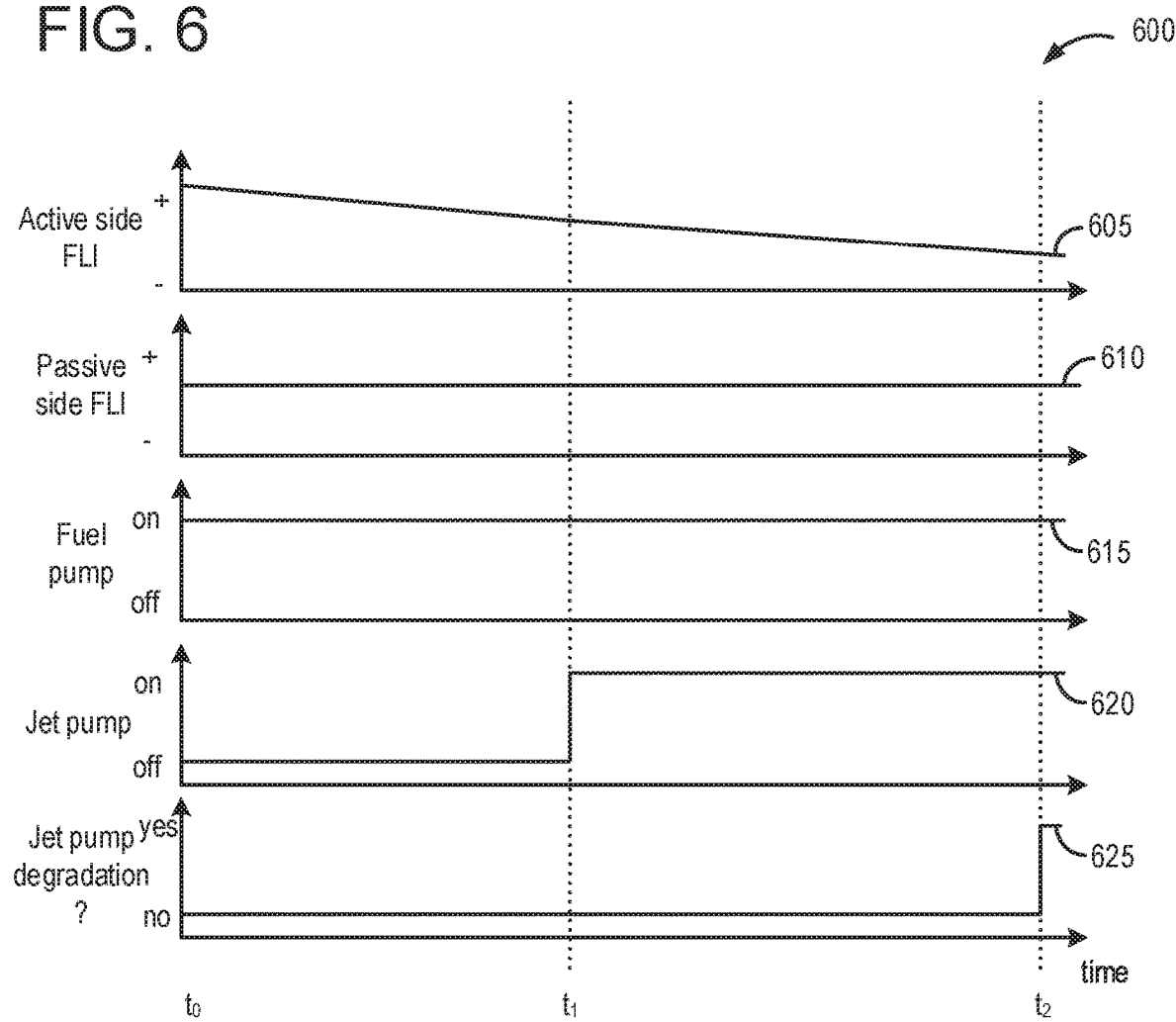

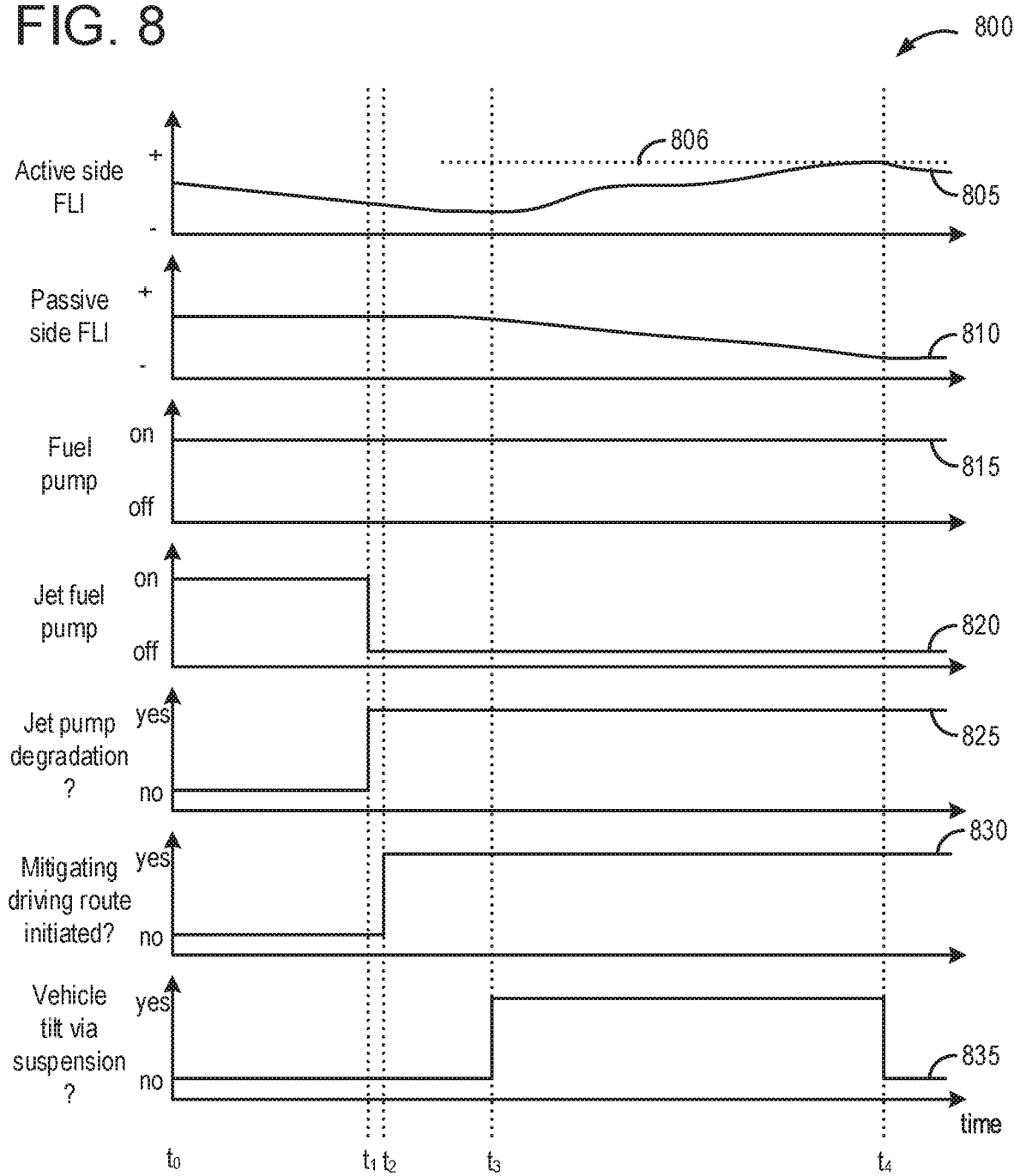

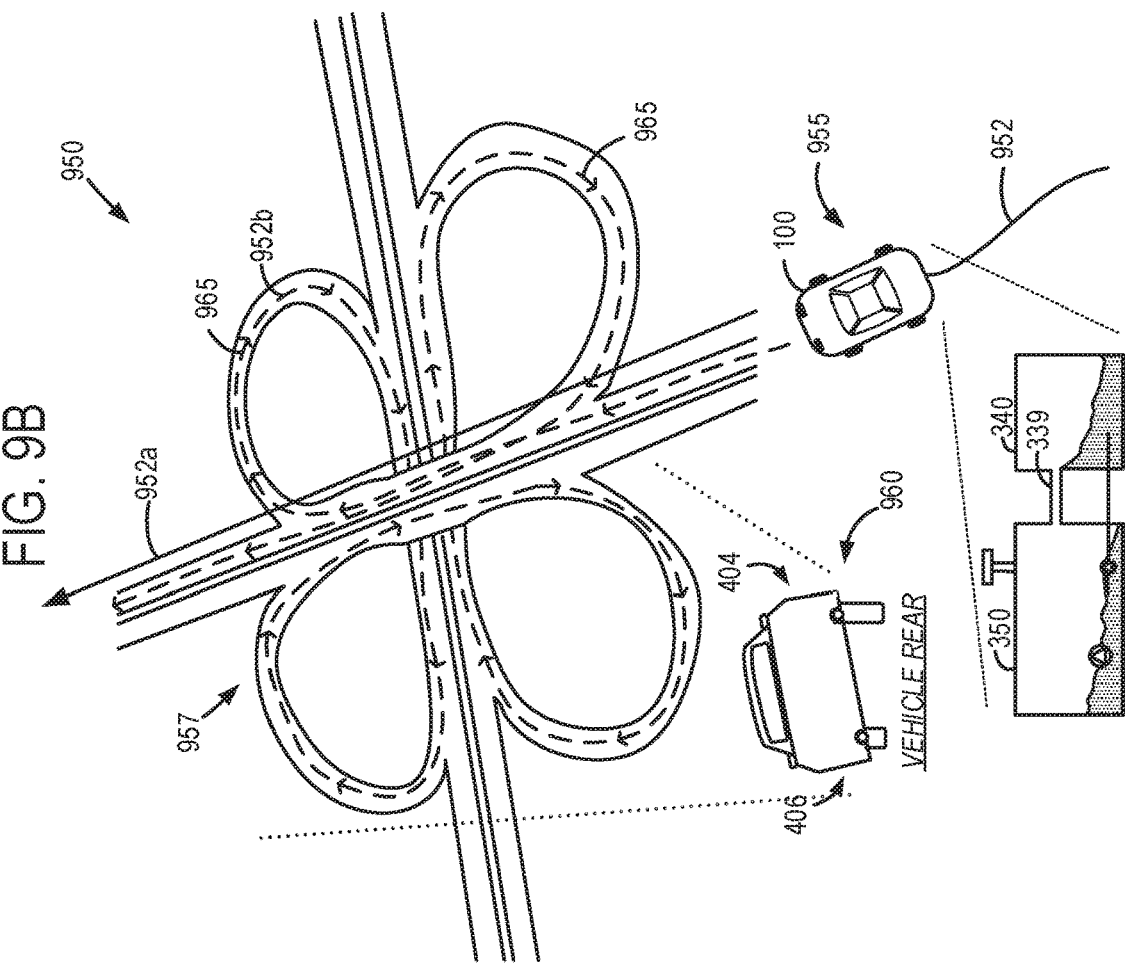
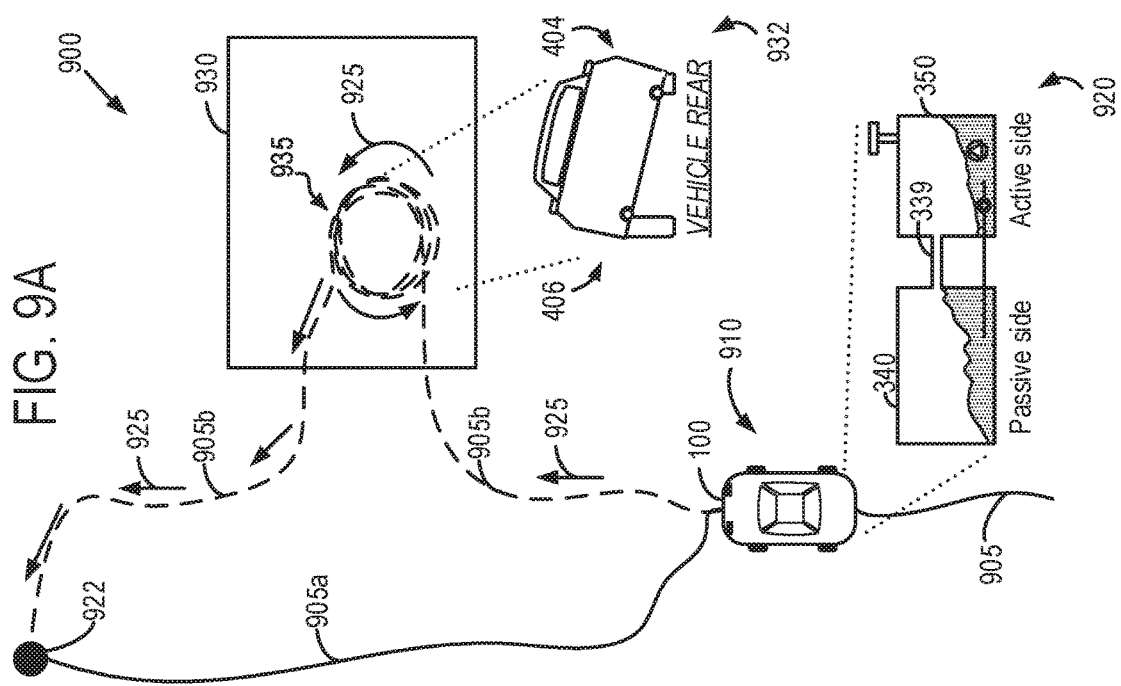

SYSTEMS AND METHODS FOR MITIGATING SADDLE FUEL TANK JET PUMP FAILURE

FIELD

The present description relates generally to methods and systems for controlling a vehicle to conduct one or more driving maneuvers to transfer fuel from a passive side to an active side of a saddle fuel tank during various conditions, such as in the event that a jet pump that transfers fuel from the passive side to the active side is degraded.

BACKGROUND/SUMMARY

Vehicle systems may be equipped with a fuel system including a bifurcated fuel tank for storing and delivering fuel to an internal combustion engine. For example, a fuel tank may include a reserve tank, or the fuel tank may be configured as a saddle tank in order to achieve compact packaging without compromising fuel storage. For example, saddle tanks may be utilized in all wheel drive (AWD) vehicles in which the AWD hardware occupies significant underbody space that is required for packaging a single tank. Further, saddle tanks may be designed to hold more fuel than standard fuel tanks, making them more desirable in vehicle systems that require more fuel storage, such as AWD vehicles.

Bifurcated or otherwise divided fuel tanks may have two or more compartments, including a first, "active" compartment and a second "passive" compartment, that are fluidly coupled. A fuel pump may be directly coupled to the active compartment (and not the passive compartment), the active compartment maintained at a full capacity by a jet pump that draws fuel from the second compartment to replenish the fuel withdrawn by the fuel pump. Over time, the jet pump may become degraded. When the jet pump becomes degraded, fuel in the passive side may be stuck and thus go unused. Such situations may result in the vehicle having to be towed if there is not enough fuel in the active side to reach a particular destination.

Such a situation may be exacerbated for autonomous vehicles or other vehicles that participate in car-sharing models. For example, such vehicles are projected to accumulate upwards of 250,000 miles in three years. Due to this high mileage accumulation, internal parts such as the jet pump may become degraded at a faster rate than cars that do not participate in car-sharing models. Systems and methods for taking mitigating action in response to jet pump degradation, is thus desirable.

The inventors herein have recognized the above-mentioned issues, and have developed systems and methods to at least partially address them. In one example, a method is provided comprising conducting a driving maneuver in response to an indication that a jet pump that functions to transfer a fuel from a passive side to an active side of a saddle fuel tank that supplies the fuel to an engine of a vehicle is degraded, the driving maneuver conducted in order to transfer a fuel amount from the passive side to the active side. In this way, even under circumstances where the jet pump is degraded, the fuel amount may be transferred to the active side where it may be utilized in order to reach a desired destination, thus preventing the vehicle from being stranded and having to request a tow.

In one example, the indication that the jet pump is degraded may include an indication that a first fuel level in the active side is decreasing and that a second fuel level in the passive side is maintained constant, under conditions where the jet pump is activated and the fuel is further being pumped to the engine for combustion via a fuel pump positioned in the active side of the saddle fuel tank.

In another example, the driving maneuver is based on a positioning of the active side and the passive side of the saddle tank in relation to the vehicle. For example, the driving maneuver may include conducting a left-handed turn (viewed from a rear of the vehicle) when the active side of the saddle tank is on a right side of the saddle tank (as viewed from the rear of the vehicle) and where the passive side is on a left side of the saddle tank. Similarly, the driving maneuver may include conducting a right-handed turn (viewed from the rear of the vehicle) when the active side of the saddle tank is on the left side of the saddle tank (as viewed from the rear of the vehicle) and where the passive side is on the right side of the saddle tank.

In yet another example, a controller may command a suspension system such as an air suspension to actively tilt the vehicle a predetermined amount while conducting the driving maneuver. More specifically, the controller may command the vehicle to be tilted the predetermined amount by lowering a side of the vehicle closest to the active side of the saddle fuel tank and raising a different side of the vehicle closer to the passive side in order to encourage the transfer of the desired amount of fuel from the passive side to the active side while conducting the driving maneuver.

The driving maneuver may be carried out by a vehicle operator, or via an autonomous control system of the vehicle. The driving maneuver may be conducted via instructions provided via the controller of the vehicle, where the instructions may be based on information obtained via an onboard navigation system, the information related to the driving maneuver. In other words, the onboard navigation system may be utilized to determine particular routes that the vehicle may travel, where the particular routes include the driving maneuver predicted to transfer the fuel amount to the active side, to allow the vehicle to reach the particular desired destination. In some examples, the instructions may include particular speeds that the vehicle may be controlled to, when conducting the driving maneuver, such that the fuel amount may be transferred to the active side.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 depicts an example timeline for determining whether a jet pump configured to transfer fuel from a passive side to an active side of a saddle fuel tank is degraded.

FIG. 8 depicts an example timeline for taking mitigating action to transfer fuel from the passive side to the active side of the saddle fuel tank, according to the method of FIG. 7.

FIGS. 9A-9B depict example driving scenarios where fuel may be transferred from the passive side to the active side of the saddle fuel tank to enable a vehicle to reach a desired destination.

DETAILED DESCRIPTION

Figure 3:
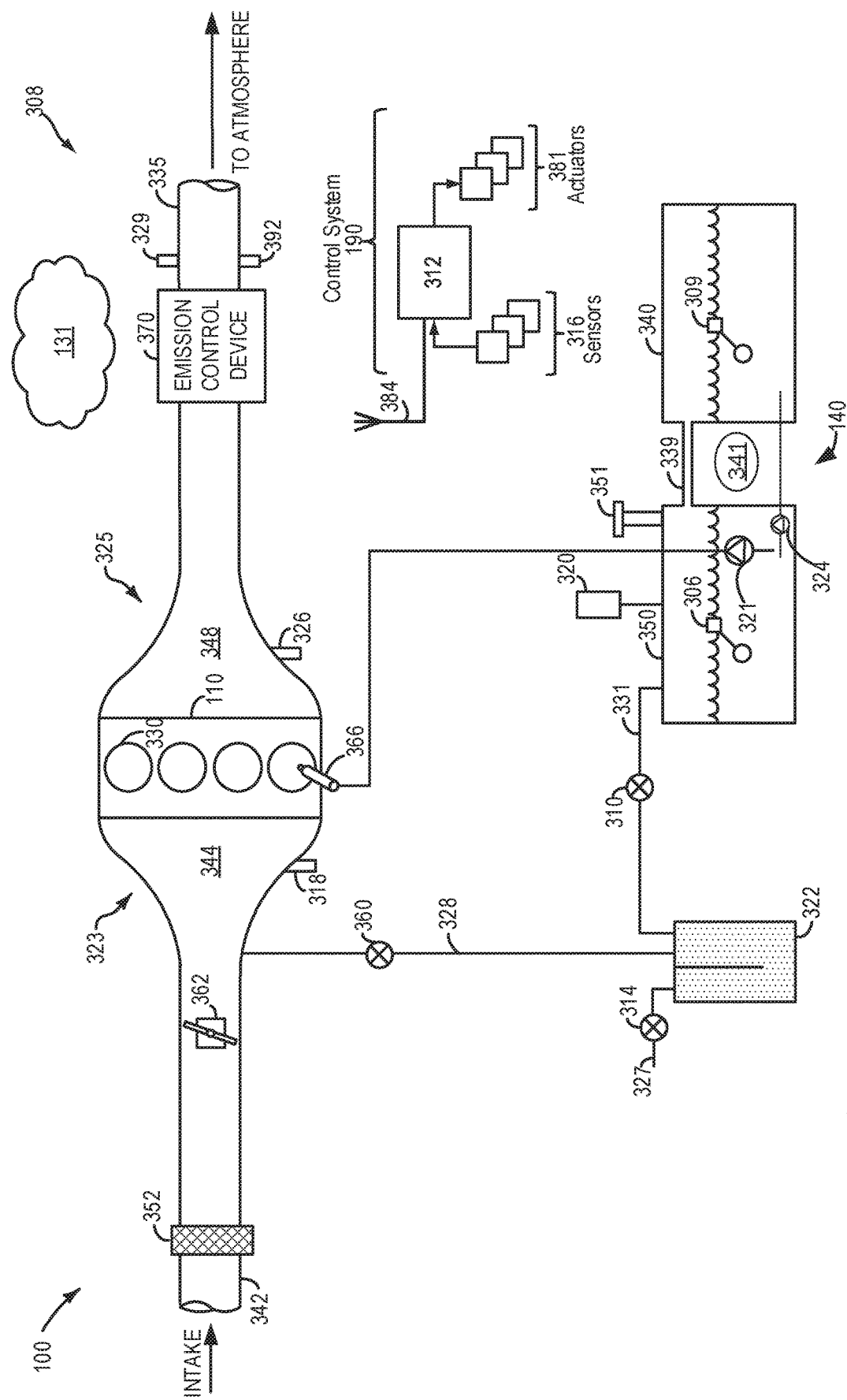
FIG. 3 schematically shows an example engine system with a fuel system that includes a saddle fuel tank and an evaporative emissions system.
Figure 4B:
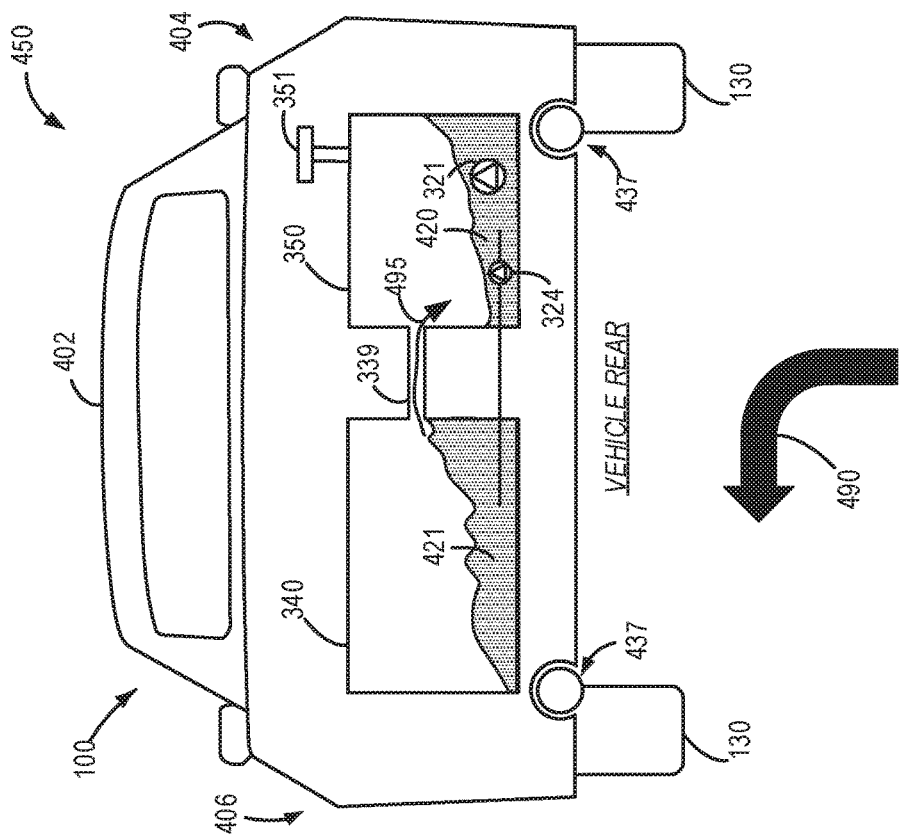
FIGS. 4A-4B depict illustrations of fuel movement in a saddle fuel tank in response to specified vehicle turning maneuvers.
Figure 4A:
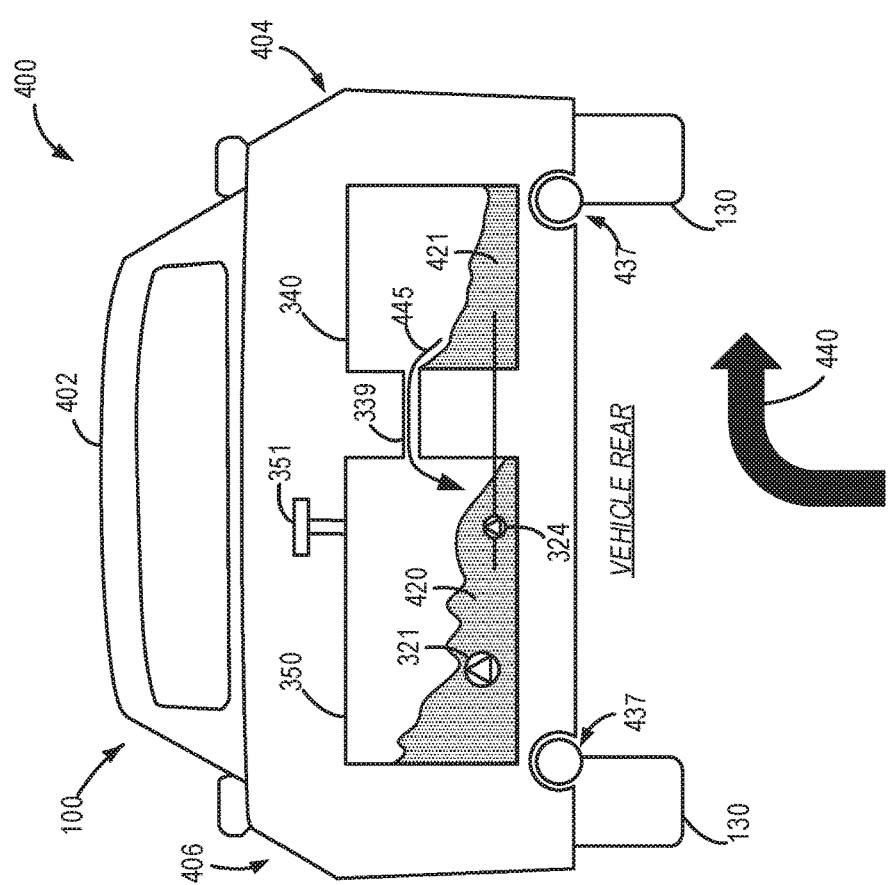
Figure 5B:
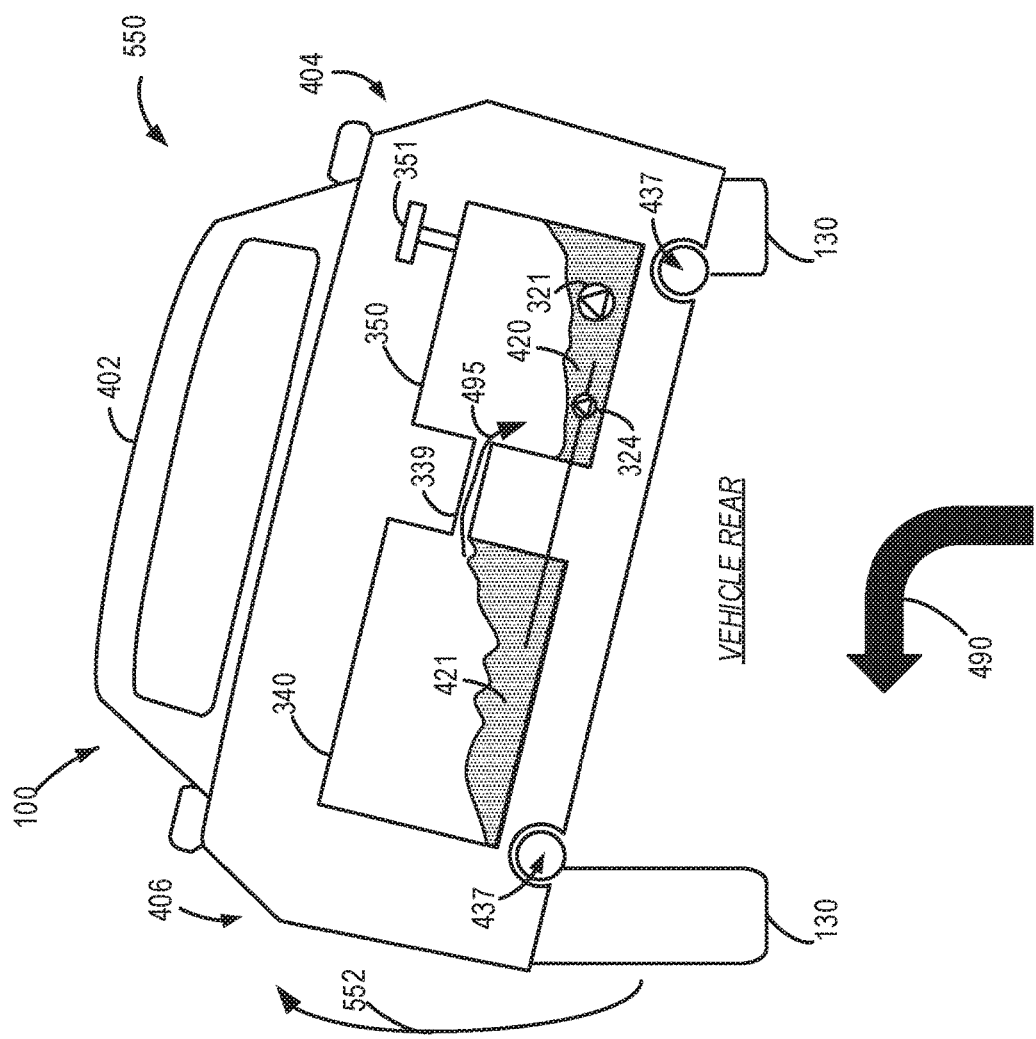
FIG. 5B depicts an illustration of a vehicle conducting a left-hand turn while additionally controlling a tilting of the vehicle.
Figure 5A:
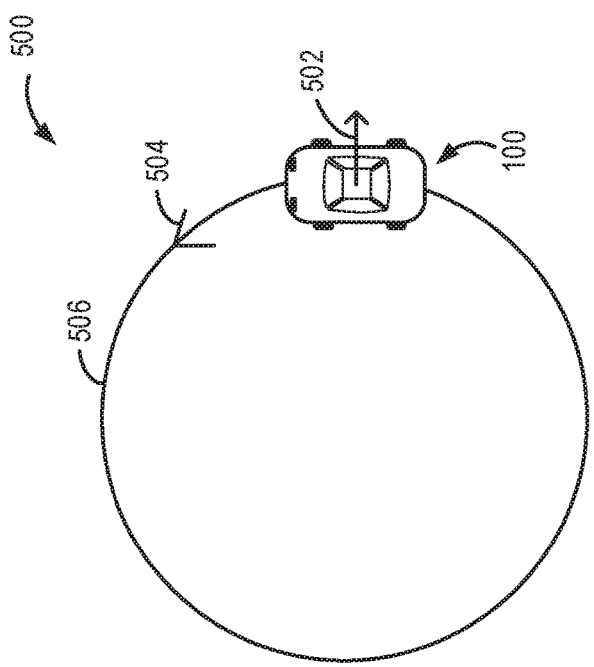
FIG. 5A depicts an illustration of a direction of centrifugal force for a vehicle making a left turn.
Figure 7:
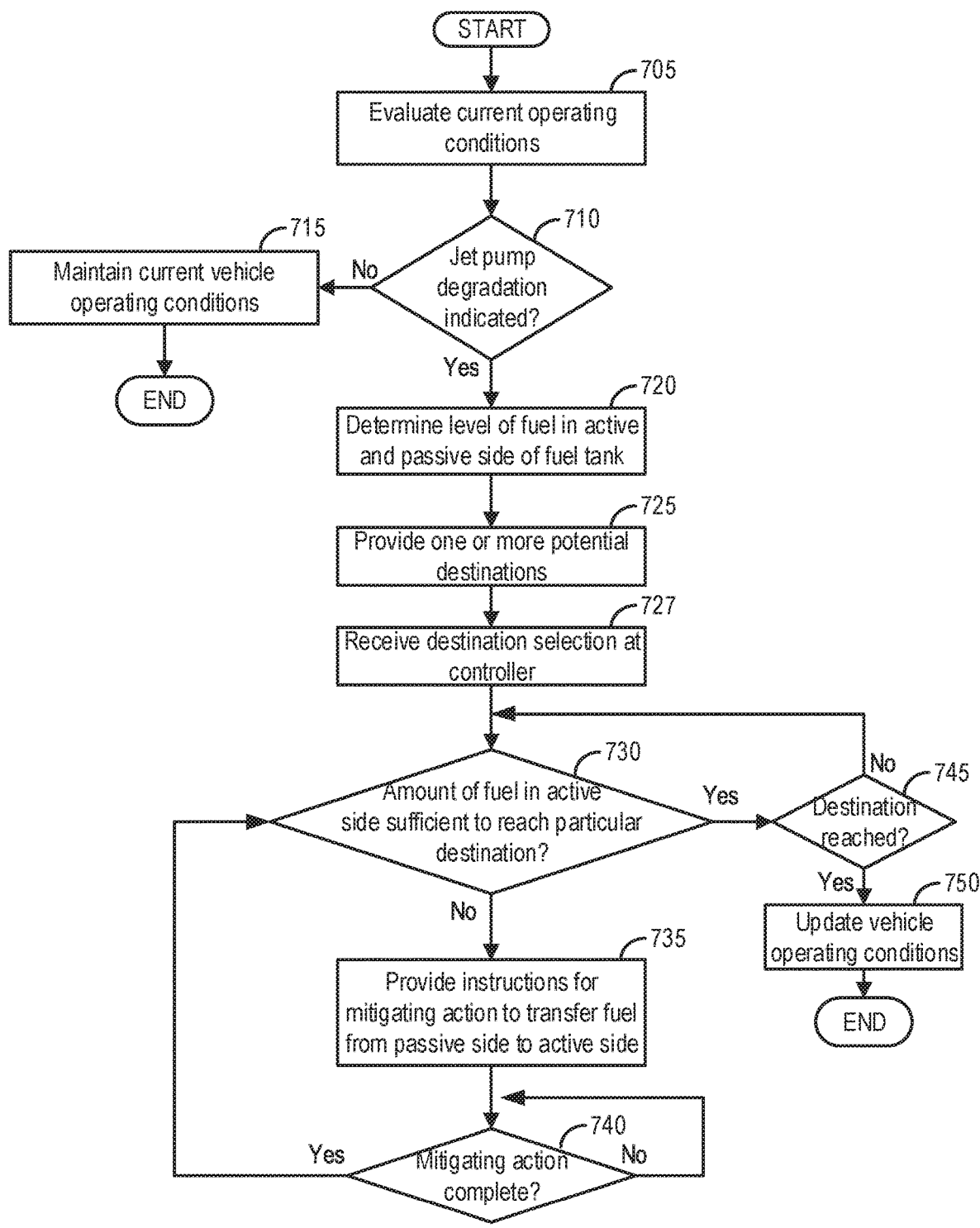
FIG. 7 depicts a high-level example method for taking mitigating action to enable a transfer of fuel from the passive side to the active side of the saddle fuel tank.

The following description relates to systems and methods for taking mitigating action in response to an indication that a jet pump that functions to transfer fuel from a passive side to an active side of a saddle fuel tank for a vehicle is degraded. The systems and methods may apply to vehicles equipped with on onboard navigation system, such as the vehicle system depicted at FIG. 1. The systems and methods may apply to vehicles that are autonomously controllable, such as via the autonomous vehicle system depicted at FIG. 2. FIG. 3 schematically illustrates the vehicle system of FIG. 1, further illustrating a fuel system including the saddle fuel tank, the fuel system coupled to an evaporative emissions system and to an engine system. FIGS. 4A-4B depict example driving scenarios which may result in the transfer of fuel from the passive side to the active side of the saddle fuel tank, depending on how the saddle fuel tank is positioned with respect to the vehicle. FIG. 5A depicts an example driving maneuver involving a left-handed turn, and a resultant centrifugal force directionality with respect to the vehicle depicted. FIG. 5B depicts an example driving maneuver that further includes tilting the vehicle via a suspension system such as an air suspension system to encourage transfer of fuel from the passive side to the active side of the saddle fuel tank. FIG. 6 depicts a timeline encompassing a methodology for determining whether the jet fuel pump is degraded. FIG. 7 depicts a high-level example method for taking mitigating action to transfer fuel from the passive side to the active side of the saddle fuel tank in response to jet pump degradation. An example timeline that relies on the method of FIG. 7 for taking mitigating action to transfer fuel from the passive side to the active side of the saddle fuel tank is depicted at FIG. 8. FIGS. 9A-9B schematically illustrate example scenarios for routes that a vehicle may travel in order to encourage the transfer of fuel from the passive side of the saddle tank to the active side, as per the methodology of FIG. 7.

Figure 1:
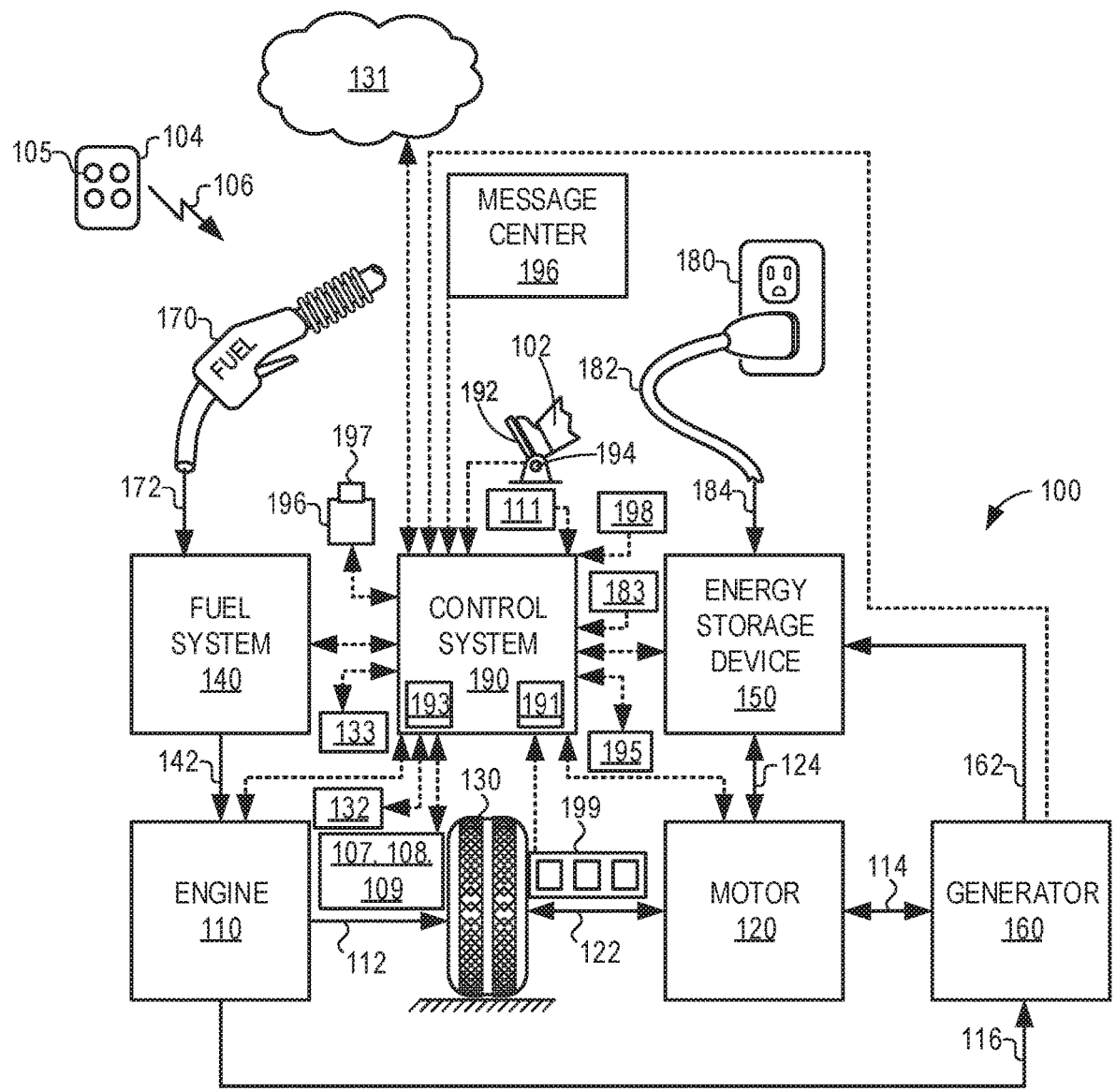
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operating input to shut down the engine, if selected idle-stop conditions, or in other words a set of predetermined conditions, are met. These may include, for example, torque demand being less than a threshold engine torque, vehicle speed below a threshold vehicle speed (e.g. 5 mph), the onboard energy storage device being sufficiently charged, no request being received for air-conditioning, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions may be reduced.

Fuel system 140 may include one or more fuel storage tanks (see FIG. 3) for storing fuel on-board the vehicle. For example, the one or more fuel storage tanks may store one or more liquid fuels, including but not limited to: gasoline, diesel, and alcohol fuels. In some examples, the fuel may be stored on-board the vehicle as a blend of two or more different fuels. For example, fuel system may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel system 140 may be configured to store the fuel received from fuel dispensing device 170 until it is supplied to engine 110 for combustion. In some examples, control system 190 may receive an indication of the level of fuel stored at fuel system 140 via a fuel level sensor. The level of fuel stored at fuel system 140 (e.g., as identified by the fuel level sensor) may be communicated to the vehicle operator (in the case of a non-autonomous vehicle), for example, via a fuel gauge or indication in a vehicle instrument panel 196.

The vehicle propulsion system 100 may also include an ambient temperature/humidity sensor 198, and a roll stability control sensor, such as inertial sensor(s) 199. Inertial sensors 199 may comprise one or more of the following: longitudinal, latitudinal, vertical, yaw, roll, and pitch sensors. As one example, inertial sensors 199 may couple to a vehicle's restraint control module (RCM) 191, the RCM 191 comprising a subsystem of control system 190. The control system may adjust engine output and/or the wheel brakes to increase vehicle stability in response to sensor(s) 199. In another example, the control system may adjust an active suspension system 111 responsive to input from inertial sensors 199. More specifically, active suspension system 111 may be connected to any variety of sensors, devices, actuators, components, modules, and other input sources located throughout the vehicle. These may include but are not limited to inertial sensors 199, suspension control modules 193, restraint control modules 192, cruise control modules, brake modules, fuel management systems, vision systems, navigation systems, telematics units, as well as any other suitable input source that can provide pertinent information to active suspension system 111. It may be appreciated that the various input sources may be embodied in software or hardware, they can be stand-alone devices or they can be integrated into other devices such as vehicle electronic modules, and they can be directly connected to active suspension system 111 or they can be connected via a communications bus or the like, to cite a few possibilities.

Furthermore, active suspension system 111 may comprise an active suspension system having pneumatic, hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Active suspension system 111 may be used with tractor trailers, commercial and non-commercial trucks, recreational vehicles (RVs), sports utility vehicles (SUVs), cross-over vehicles, passenger cars, as well as any other motorized vehicle.

As will be described in further detail below, in one example, active suspension system 111 may be employed in order to tilt a vehicle a predetermined amount to encourage a transfer of fuel from a passive side to an active side of a saddle fuel tank, under conditions where a jet fuel pump that functions to transfer fuel from the passive side to the active side is indicated to be degraded.

Vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In other words, vehicle instrument panel may include a human machine interface (HMI) which a user may interact with. As one example, the vehicle instrument panel 196 may include a refueling button 197 which may be manually actuated or pressed by a vehicle operator to initiate refueling. For example, in response to the vehicle operator actuating refueling button 197, the fuel system in the vehicle may be depressurized so that refueling may be performed. In examples where the vehicle comprises an autonomous vehicle, refueling may be initiated under the control of control system 190, where refueling may be initiated without manual actuation of refueling button 197.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. Specifically, control system 190 may be coupled to a wireless communication device (not shown at FIG. 1 but see 384 at FIG. 3) for direct communication of the vehicle system 100 with wireless network 131. Using wireless communication, the vehicle system 100 may in some examples retrieve data from servers, infrastructures, other vehicles, etc., regarding current and/or upcoming ambient conditions (such as ambient humidity, temperature, pressure, precipitation, wind, etc.), current traffic conditions, etc.

Vehicle system 100 may also include an onboard navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle, or commonly traveled by a particular vehicle operator, or commonly traveled by a passenger (in the case of an autonomous vehicle) may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. The GPS may in some examples also provide suggested routes for a vehicle to take, depending on current vehicle operating conditions, current traffic conditions, etc. As an example and which will be further discussed below, the GPS may provide one or more suggested routes for traveling to one or more particular destination(s) in order to use the least amount of fuel possible. Such capability may be useful in situations where fuel level in the fuel system 140 is low, for example, and/or in situations where a jet pump that transfers fuel from a passive side of a saddle fuel tank to an active side of the saddle fuel tank, is degraded.

Vehicle system 100 may in some examples further include sensors dedicated to indicating the occupancy-state of the vehicle, for example seat load cells 107, door sensing technology 108, and onboard cameras 109.

Furthermore, as discussed herein, the methods and systems may be applicable to autonomous vehicles. Accordingly, turning now to FIG. 2, a block diagram of an example autonomous driving system 200 that may operate, for example, the vehicle system 100 in conjunction with control system 190, described above at FIG. 1. Herein, the vehicle system 100 will be referred to simply as a "vehicle". The autonomous driving system 200, as shown, includes a user interface device 210, a navigation system 215 (e.g. same as 132), at least one autonomous driving sensor 220, an autonomous mode controller 225, and vehicle subsystems 230. Depicted as a solid vertical double-sided arrow is control system 190.

The user interface device 210 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 210 may be configured to receive user inputs. Thus, the user interface device 210 may be located in a passenger compartment (not shown) of the vehicle. In some possible approaches, the user interface device 210 may include a touch-sensitive display screen.

The navigation system 215 may be configured to determine a current location of the vehicle using, for example, a Global Positioning System (GPS) receiver configured to triangulate the position of the vehicle relative to satellites or terrestrial based transmitter towers. The navigation system 215 may be further configured to develop routes from the current location to a selected destination, as well as display a map and present driving directions to the selected destination via, for example, the user interface device 210. In some examples the selected destination may comprise a destination selected via a passenger in the vehicle, or may be autonomously selected via the control system.

The autonomous driving sensors 220 may include any number of devices configured to generate signals that help navigate the vehicle. Examples of autonomous driving sensors 220 may include a radar sensor, a lidar sensor, a vision sensor (e.g. a camera), V2V and/or V2I2V infrastructure networks, or the like. The autonomous driving sensors 220 may enable the vehicle to "see" the roadway and vehicle surroundings, and/or negotiate various obstacles while the vehicle 100 is operating in autonomous mode. The autonomous driving sensors 220 may be configured to output sensor signals to, for example, the autonomous mode controller 225. It may be understood that such sensors may additionally be included in a vehicle that is not controlled autonomously, in order to assist in the conducting of particular vehicle maneuvers (see for example onboard cameras 109 and sensors 133 depicted above at FIG. 1).

The autonomous mode controller 225 may be configured to control one or more subsystems 230 while the vehicle is operating in the autonomous mode. Examples of subsystems 230 that may be controlled by the autonomous mode controller 225 may include a brake subsystem, a suspension subsystem, a steering subsystem, and a powertrain subsystem. The autonomous mode controller 225 may control any one or more of these subsystems 230 by outputting signals to control units associated with subsystems 230. In one example, the brake subsystem may comprise an anti-lock braking subsystem, configured to apply a braking force to one or more of wheels (e.g. 130). Discussed herein, applying the braking force to one or more of the vehicle wheels may be referred to as activating the brakes. To autonomously control the vehicle, the autonomous mode controller 225 may output appropriate commands to the subsystems 230. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, speed of the vehicle, etc.

Whether the vehicle is autonomously operated, operated via a human driver, or some combination of both (e.g. human driver under some circumstances while autonomously operated under other circumstances), the vehicle systems described above may participate in car-sharing models. Discussed herein, a car-sharing model includes a model of car rental where people rent vehicles for short periods of time. In some examples, a customer may pay for the use of such a vehicle by the hour, as a function of miles driven, etc. Such vehicles may accumulate much more mileage in a short period of time than vehicles that do not participate in car-sharing. Accordingly, such vehicles are likely to have issues related to degradation on a potentially more frequent basis than other vehicles that do not participate in car-sharing models. As one example, a jet pump (see FIG. 3)

FIG. 3 shows a schematic depiction of a vehicle system 100 that can derive propulsion power from engine system 308. Vehicle system 100 may be a conventional vehicle powered solely through combustion, or it may be a hybrid vehicle system that can derive propulsion power from engine system 308 and/or an on-board energy storage device (e.g. 150), such as a battery system. An energy conversion device, such as a generator (e.g. 160), may be operated to absorb energy from vehicle motion and/or engine operation, and then convert the absorbed energy to an energy form suitable for storage by the energy storage device.

Engine system 308 may include an engine 110 having a plurality of cylinders 330. Engine 110 includes an engine intake 323 and an engine exhaust 325. Engine intake 323 includes an air intake throttle 362 fluidly coupled to the engine intake manifold 344 via an intake passage 342. Air may enter intake passage 342 via air filter 352. Engine exhaust 325 includes an exhaust manifold 348 leading to an exhaust passage 335 that routes exhaust gas to the atmosphere. Engine exhaust 325 may include one or more emission control devices 370 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 308 is a boosted engine system, the engine system may further include a boosting device, such as a turbocharger (not shown).

Engine system 308 is coupled to a fuel system 140. Fuel system 140 includes a fuel tank 350 coupled to a fuel pump 321 and a fuel vapor canister 322. During a fuel tank refueling event, fuel may be pumped into the vehicle from an external source through refueling port 351. Fuel tank 350 may hold a plurality of fuel blends, including fuel with a range of alcohol concentrations, such as various gasoline-ethanol blends, including E10, E85, gasoline, etc., and combinations thereof. A first fuel level sensor 306 located in fuel tank 350 may provide an indication of the fuel level ("Fuel Level Input") to controller 312. As depicted, fuel level sensor 306 may comprise a float connected to a variable resistor. Alternatively, other types of fuel level sensors may be used.

Fuel tank 350 may be configured as a bifurcated fuel tank, or a fuel tank with two or more separate chambers, wherein each chamber is fluidically coupled to at least one other chamber via a conduit. In this example, secondary fuel tank 340 is shown coupled to primary fuel tank 350. Discussed herein, secondary fuel tank 340 may be referred to as passive fuel tank 340, and primary fuel tank 350 may be referred to as active fuel tank 350. Discussed herein, primary fuel tank 350 may also be referred to as "active side" 350, and secondary fuel tank 340 may be referred to as "passive side" 340. Primary fuel tank 350 and secondary fuel tank 340 may be considered a single, saddle fuel tank, which may be configured to be placed over the engine driveline 341. Secondary fuel tank 340 may hold additional fuel that is metered to primary fuel tank 350 via a jet pump 324. Jet pump 324 may transfer fuel from secondary fuel tank 340 to primary fuel tank 350, based on a signal received from controller 312, for example. In some examples, jet pump 324 may be configured to constantly replenish fuel withdrawn from primary fuel tank 350 by fuel pump 321. Jet pump 324 may transfer fuel between secondary fuel tank 340 and primary fuel tank 350 via a conduit or hose coupled to jet pump 324. Jet pump 324 may have an inlet positioned in secondary fuel tank 340 and an outlet positioned in fuel tank 350. However, under some conditions, jet pump 324 may operate in the reverse direction to transfer fuel from primary fuel tank 350 to secondary fuel tank 340. Further, in some embodiments, jet pump 324 and fuel pump 321 may be combined into a single pump unit.

A conduit 339 may couple primary fuel tank 350 to secondary fuel tank 340 to allow vapors produced in secondary fuel tank 340 to be routed to canister 322. In some examples, jet pump 324 may transfer fuel between fuel tank 350 and secondary fuel tank 340 via a hose or conduit passing through conduit 339. During certain vehicle maneuvers or other conditions that may cause fuel sloshing, fuel from primary fuel tank 350 may flow into secondary tank 340, or vice-versa via conduit 339. Fuel may in some examples also flow between primary fuel tank 350 and secondary tank 340 (or vice-versa) via conduit 339 when the vehicle is traversing a steep gradient. In some examples, during refueling, upon primary fuel tank 350 reaching full capacity, fuel may flow from primary fuel tank 350 into secondary fuel tank 340 via conduit 339. In some examples, jet pump 324 may mediate fuel transfer between primary fuel tank 350 and secondary fuel tank 340 during refueling events. In some examples, secondary fuel tank 340 may include a refueling port in addition to or as an alternative to refueling port 351. Further, a second fuel level sensor 309 located in fuel tank 340 may provide an indication of the fuel level ("Fuel Level Input") in secondary fuel tank 340 to controller 312. As depicted, fuel level sensor 309 may comprise a float connected to a variable resistor. Alternatively, other types of fuel level sensors may be used. Further, vehicle system 100 may include an overall fuel level indicator (not shown) that indicates an average of an output of first fuel level indicator 306 and second fuel level indicator 309.

Fuel pump 321 is configured to pressurize fuel delivered to the injectors of engine 110, such as example injector 366. While only a single injector 366 is shown, additional injectors are provided for each cylinder. It will be appreciated that fuel system 140 may be a return-less fuel system, a return fuel system, or various other types of fuel system. Vapors generated in fuel tank 350 and/or 340 may be routed to fuel vapor canister 322, via conduit 331, before being purged to the engine intake 323.

Fuel vapor canister 322 may be filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 322 may be purged to engine intake 323 via purge line 328 by opening canister purge valve 360. While a single canister 322 is shown, it will be appreciated that fuel system 140 may include any number of canisters.

Canister 322 includes a vent 327 for routing gases out of the canister 322 to the atmosphere when storing, or trapping, fuel vapors from fuel tank 350. Vent 327 may also allow fresh air to be drawn into fuel vapor canister 322 when purging stored fuel vapors to engine intake 323 via purge line 328 and purge valve 360. While this example shows vent 327 communicating with fresh, unheated air, various modifications may also be used. Vent 327 may include a canister vent valve 314 to adjust a flow of air and vapors between canister 322 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 100 is a hybrid vehicle, it may have reduced engine operation times due to the vehicle being powered by engine system 308 during some conditions, and by the energy storage device (e.g. 150) under other conditions. While the reduced engine operation times reduce overall carbon emissions from the vehicle, they may also lead to insufficient purging of fuel vapors from the vehicle's emission control system. To address this, a fuel tank isolation valve 310 may be optionally included in conduit 331 such that fuel tank 350 is coupled to canister 322 via the valve. During regular engine operation, isolation valve 310 may be kept closed to limit the amount of diurnal or "running loss" vapors directed to canister 322 from fuel tank 350. During refueling operations, and selected purging conditions, isolation valve 310 may be temporarily opened, e.g., for a duration, to direct fuel vapors from the fuel tank 350 to canister 322. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 310 positioned along conduit 331, in alternate embodiments, the isolation valve may be mounted on primary fuel tank 350.

Pressure sensor 320 may be coupled to fuel system 140 for providing an estimate of a fuel system pressure. In one example, the fuel system pressure is a fuel tank pressure, wherein pressure sensor 320 is a fuel tank pressure transducer (FTPT) coupled to fuel tank 350 for estimating a fuel tank pressure or vacuum level. In some examples, a second pressure sensor (not shown) may be coupled to secondary fuel tank 340 for estimating a fuel tank pressure or vacuum level. While the depicted example shows the pressure sensor directly coupled to primary fuel tank 350, in alternate embodiments, pressure sensor 320 may be coupled between the fuel tank and canister 322, specifically between the fuel tank and isolation valve 310. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve.

Fuel vapors released from canister 322, for example during a purging operation, may be directed into engine intake manifold 344 via purge line 328. The flow of vapors along purge line 328 may be regulated by canister purge valve 360, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 312, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown)

may be included in purge line 328 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 318 coupled to intake manifold 344 and communicated with controller 312. Alternatively, MAP may be inferred from alternate engine operating conditions, such as mass air flow (MAF), as measured by a MAF sensor (not shown) coupled to the intake manifold.

Fuel system 140 may be operated by controller 312 in a plurality of modes by selective adjustment of the various valves and solenoids. For example, the fuel system may be operated in a fuel vapor storage mode (e.g., during a fuel tank refueling operation and with the engine not running), wherein the controller 312 may open isolation valve 310 while closing canister purge valve (CPV) 360 to direct refueling vapors into canister 322 while preventing fuel vapors from being directed into the intake manifold.

As another example, the fuel system may be operated in a refueling mode (e.g., when fuel tank refueling is requested by a vehicle operator), wherein the controller 312 may open isolation valve 310, while maintaining canister purge valve 360 closed, to depressurize the fuel tank before allowing fuel to be added therein. As such, isolation valve 310 may be kept open during the refueling operation to allow refueling vapors to be stored in the canister. After refueling is completed, the isolation valve may be closed.

Returning to the discussion on operating modes of the fuel system, as yet another example, the fuel system may be operated in a canister purging mode (e.g., after an emission control device light-off temperature has been attained and with the engine running), wherein the controller 312 may open canister purge valve 360 while closing isolation valve 310. Herein, the vacuum generated by the intake manifold of the operating engine may be used to draw fresh air through vent 327 and through fuel vapor canister 322 to purge the stored fuel vapors into intake manifold 344. In this mode, the purged fuel vapors from the canister are combusted in the engine. Controller 312 may also be configured to intermittently perform diagnostic routines for presence or absence of undesired evaporative emissions on fuel system 140 to confirm that the fuel system is not degraded. As such, such diagnostic routines may be performed while the vehicle is running with the engine on (e.g., during an engine mode of hybrid vehicle operation) or with the engine off (e.g., during a battery mode of hybrid vehicle operation).

The controller 312 may be coupled to a wireless communication device 384 for direct communication of the control system 190 and vehicle system 100 with wireless network 131, as mentioned above.

Vehicle system 100 may further include control system 190. Control system 190 is shown receiving information from a plurality of sensors 316 (various examples of which are described herein) and sending control signals to a plurality of actuators 381 (various examples of which are described herein). As one example, sensors 316 may include exhaust gas sensor 326 located upstream of the emission control device, temperature sensor 392, MAP sensor 318, pressure sensor 329, first fuel level sensor 306, second fuel level sensor 309, and fuel tank pressure sensor 320. Other sensors such as additional pressure, temperature, air/fuel ratio, and composition sensors may be coupled to various locations in the vehicle system 100. As another example, the actuators may include fuel injector 366, isolation valve 310, purge valve 360, vent valve 314, fuel pump 321, and throttle 362. The control system 190 may include a controller 312. The controller may receive input data from the various sensors, process the input data, and trigger the actuators in response to the processed input data based on instruction or code programmed therein corresponding to one or more routines. For example, controller 312 receives signals from the various sensors of FIG. 3 and employs the various actuators of FIG. 3 to adjust engine operation based on the received signals and instructions stored on a memory of the controller. Example control routines are described herein with regard to FIG. 7.

Thus, the systems discussed above with regard to FIGS. 1-3 may enable a system for a vehicle, comprising a saddle fuel tank for storing a fuel that includes an active side with a fuel pump that supplies the fuel from the active side to an engine for combustion, and a jet pump that transfers the fuel from a passive side of the saddle fuel tank to the active side. Such a system may further include an onboard navigation system, and an autonomous vehicle system. Such a system may further include a controller with computer readable instructions stored on non-transitory memory that when executed. The instructions may cause the controller to 1) indicate degradation of the jet pump in response to a first fuel level in the active side decreasing while a second fuel level in the passive side is maintained constant under conditions where both the fuel pump and the jet pump are activated, 2) request from the onboard navigation system a plurality of routes and associated destinations for the vehicle, the routes specified to include one or more driving scenarios predicted to result in a transfer of the fuel from the passive side to the active side under conditions where the associated destinations are determined not able to be reached via the vehicle based on the first fuel level in the active side, 3) receive a selection as to a desired destination from one of the plurality of routes and associated destinations, 4) provide a set of instructions to enable the vehicle to be propelled along a route associated with the desired destination, and 5) propel the vehicle via the set of instructions along the route associated with the desired destination via the autonomous vehicle system in order to reach the desired destination.

In one example of such a system, the controller may store further instructions to receive the selection from a passenger of the vehicle via a human machine interface under conditions where the vehicle is occupied via the passenger, or the controller may store further instructions to select the desired destination from one of the plurality of routes and associated destinations under conditions where the vehicle is unoccupied.

In another example of such a system, the system may further comprise an active suspension system. The controller may thus store further instructions to control a tilting of the vehicle during the one or more driving scenarios via the active suspension system to encourage a greater amount of fuel transfer from the passive side to the active side as compared to not controlling the tilting of the vehicle.

As discussed above, when the jet pump becomes degraded such that it is not transferring fuel from the passive side (e.g. 340) of the fuel tank to the active side (e.g. 350), then the active side may become starved of fuel with remaining fuel in the passive side going unused. In such a scenario, the vehicle may need to be towed if the amount of fuel in the active side is not enough to propel the vehicle to a desired destination.

However, it is herein recognized that certain vehicle maneuvers may result in the transfer of fuel from the passive side of the tank to the active side. Accordingly, turning to FIGS. 4A-4B, schematic illustrations 400 and 450, respectively, are depicted that illustrate changes in fuel fill level in a saddle fuel tank that comprises an active side and a passive side, depending on a direction that the vehicle is turning. Depicted at FIGS. 4A-4B is the vehicle propulsion system 100 depicted at FIGS. 1-3, with a saddle fuel tank that includes the active side 350 and the passive side 340. The active side includes fuel pump 321 and jet pump 324, along with refueling port 351.

For FIGS. 4A-4B, each of the illustrations 400 and 450, respectively, depicts a view of a rear of vehicle propulsion system 100. As such, an observer may be looking at the rear of vehicle propulsion system 100. For example, tail pipes 437 are shown at the rear of the vehicle. Furthermore, for each of FIGS. 4A-4B, the active side 350 and passive side 340 are depicted as shown, relative to a top 402 of vehicle propulsion system 100, a passenger side 404 or right side, and a driver's-side 406 or left side. In FIG. 4A, it may be appreciated that the active side 350 is on the left side 406 of the vehicle system, whereas in FIG. 4B the active side 350 is on the right side 404 of the vehicle system. Since FIGS. 4A and 4B depict vehicle propulsion system 100 of FIGS. 1-3, relevant components previously introduced are numbered the same. Fuel in the active side 350 for both FIGS. 4A-4B is depicted as numeral 420, while fuel in the passive side 340 is depicted as numeral 421.

Turning specifically to FIG. 4A, when the vehicle turns right, as depicted by bold arrow 440, fuel 420 in the active tank 350 shifts to the left side of the active tank 350 and away from the right side of active tank 350 due to centrifugal forces. Similarly, fuel 421 in the passive tank 340 shifts to the left side of passive tank 340 and away from the right side of passive tank 340 due to centrifugal forces. In such a scenario, fuel 421 may be transferred from the passive tank 340 to the active tank 350, via conduit 339 as indicated by arrow 445. Of course, while not explicitly illustrated, it may be understood that for FIG. 4A, if the active side 350 were positioned on the right side of vehicle propulsion system 100 with the passive side 340 positioned on the left side, then when the vehicle turned to the right, fuel may be transferred from the active side to the passive side.

Turning now to FIG. 4B, when the vehicle turns left, as depicted by bold arrow 490, fuel 420 in the active tank 350 shifts to the right side of active tank 350 and away from the left side of active tank 350 due to centrifugal forces. Similarly, fuel 421 in the passive tank 340 shifts to the right side of passive tank 340 and away from the left side of passive tank 340 due to centrifugal forces. In such a scenario, fuel 421 may be transferred from the passive tank 340 to the active tank 350, via conduit 339 as indicated by arrow 495. Of course, while not explicitly illustrated, it may be understood that for FIG. 4B, if the active side 350 were positioned on the left side of vehicle propulsion system 100 with the passive side 340 positioned on the right side, then when the vehicle turned to the left, fuel may be transferred from the active side to the passive side.

Thus, based on the above description of FIG. 4A-4B it may be understood that certain driving maneuvers that involve turning of the vehicle, depending on where the active side of the tank is positioned, may result in fuel being transferred from the passive side to the active side. If such maneuvers are consistently performed, for example turning repeatedly in a circular motion, or taking a route that involves any number of turns that result in transfer of fuel from the passive side to the active side, then the active side may be supplied with enough fuel to be able to reach a desired destination, without having to be towed or without having to bring fuel from an outside source to the vehicle for fueling purposes. A desired destination may comprise a service station, for example. Thus, such driving maneuvers may be conducted in response to jet pump failure in order to enable the vehicle to reach a desired destination, as will be discussed in further detail below.

It may be further understood that an amount of fuel that may be transferred from the passive side to the active side (or vice versa) during conducting certain driving maneuvers may be based on an angle of a particular turn, where a sharper angle may result in a greater amount of fuel being transferred from the passive side to the active side. Still further, it may be understood that vehicle speed during the conducting of such driving maneuvers may contribute to the transfer of fuel from the passive side to the active side. For example, higher speeds may result in a greater amount of fuel transfer. Thus, it may be understood that fuel transfer may be greater the sharper the turn, for example, and the greater the speed.

While conducting such maneuvers may in some examples be sufficient to transfer a desired amount fuel from the passive side of the fuel tank to the active side, it is herein recognized that there may be circumstances where it may be beneficial for the transfer to tilt the vehicle to encourage additional transfer of fuel to the active side than would be otherwise possible in the absence of tilting the vehicle. Turning to FIG. 5A, an example illustration 500 is shown, depicting the vehicle propulsion system of FIGS. 1-3. Example illustration depicts a direction of centrifugal force represented by arrow 502, under conditions where vehicle system 100 is turning to the left when driving in a circular motion along path 506, the direction of travel indicated by arrow 504. While not explicitly illustrated at FIG. 5A, it may be understood that the vehicle system may include a saddle tank with the active side on the right side of the vehicle, similar to that depicted at FIG. 4B. Thus, when such a maneuver as that depicted at FIG. 5A is conducted, fuel may be transferred from the passive side to the active side of the tank, due to the centrifugal force depicted by arrow 502. As discussed above, depending on the sharpness of the turn and the speed at which such a driving maneuver as that depicted at FIG. 5A is conducted, the amount of fuel transferred between the passive side and the active side of the saddle fuel tank may vary. For example, a smaller circumference circular driving maneuver may result in a greater amount of fuel transfer, as compared to a larger circumference circular driving maneuver conducted at a same vehicle speed. In other examples, similar amounts of fuel may be transferred for such a larger circumference circular driving maneuver, if vehicle speed is corresponding increased to compensate for the large circumference circular driving maneuver.

In such an example as that depicted at FIG. 5A, if the active suspension (e.g. 111), for example an air suspension, is employed (e.g. actuated via the controller) to tilt the vehicle, an even greater amount of fuel may be transferred from the passive side to the active side of the saddle fuel tank, and a rate at which fuel is transferred from the passive side to the active side may be increased as well. Accordingly, turning to FIG. 5B, an example illustration 550 is shown where vehicle propulsion system 100 is depicted as above at FIG. 4B and FIG. 5A, as performing a vehicle maneuver that involves turning to the left. Components depicted at FIG. 5B that are the same as that depicted at FIG. 4B are illustrated as the same numerals. As discussed at FIG. 4B and FIG. 5A, such a maneuver may transfer fuel 421 from the passive side 340 to the active side 350, via conduit 339. However, the amount and rate at which fuel may be transferred from the passive side to the active side of the saddle fuel tank may be increased under conditions where active suspension is utilized to tilt the vehicle such that the left side 406 is raised in comparison to the right side 404, the tilting direction depicted as arrow 552. In this way, more fuel may be transferred from the passive side to the active side for a particular maneuver and/or fuel may be transferred at a greater rate.

While not explicitly illustrated, it may be understood that in an alternative example where the saddle fuel tank comprises an active side on the left-hand side or driver's side (see FIG. 5A), fuel may be transferred from the passive side to the active side when conducting a right-hand turn or driving in a circle to the right. In such an example, the left side of the vehicle may be lowered and the right side of the vehicle raised via the actuation of the active suspension as discussed under control of the controller, in order to further encourage fuel transfer from the passive side to the active side of the saddle fuel tank.

The mitigating action to transfer fuel from the passive side to the active side of a saddle fuel tank may include an autonomous vehicle being commanded to drive a certain route (with a specified number of appropriate turns that may result in a desired transfer of fuel from the passive side to the active side of the saddle fuel tank) and/or in a certain way (e.g. drive in a circle in a parking lot), or in other examples may include the vehicle controller providing a request to a vehicle operator to conduct such certain maneuvers and/or travel along such particular routes. Such details will be discussed in greater detail below. In either case, however, prior to taking such mitigating action, an indication of jet pump degradation may first be provided. Accordingly, turning now to FIG. 6, an example timeline 600 is depicted, illustrating a diagnostic that may be used to indicate whether the jet pump is functioning as desired, or in other words is effectively transferring fuel from the passive side to the active side of the saddle tank, or if the jet pump is degraded and not effectively transferring fuel from the passive side to the active side. The steps conducted as detailed by example timeline 600 may be carried out as a method by the controller (e.g. 312), where the instructions for the method may be stored in non-transitory memory and when executed, may cause the controller to conduct the diagnostic detailed at timeline 600.

Timeline 600 includes plot 605, indicating fuel level in an active side (e.g. 350) of a saddle fuel tank, as monitored by a first fuel level indicator (FLI) (e.g. 306) positioned in the active side of the saddle tank, over time. Timeline 600 further includes plot 610, indicating fuel level in a passive side (e.g. 340) of the saddle fuel tank, as monitored by another fuel level indicator (FLI) (e.g. 309) positioned in the passive side of the saddle tank, over time. Fuel level in both the active side (plot 605) and passive side (plot 610) may increase (+) or decrease (−), over time. Timeline 600 further includes plot 615, indicating whether the fuel pump (e.g. 321) that provides fuel to fuel injectors (e.g. 366) is on, or off, over time. Timeline 600 further includes plot 620, indicating whether the jet pump (e.g. 324) that functions to transfer fuel from the passive side to the active side of the saddle fuel tank, is on or off, over time. Timeline 600 further includes plot 625, indicating whether jet pump degradation is indicated (yes or no), over time.

At time t0, the fuel pump is on (plot 615), but the jet pump is off (plot 620). Fuel in the active side thus decreases between time t0 and t1, as fuel is being provided to the engine for combustion, but is not being replenished via the jet pump transferring fuel from the passive side to the active side. Because the jet pump is off (plot 620), fuel level in the passive side of the tank remains constant, as would be expected. At time t1, the fuel pump is maintained on (plot 615), and the jet pump is activated on (plot 620). However, between time t1 and t2, the fuel level in the active side of the tank continues to decrease (plot 605), while fuel level in the passive side of the tank remains constant. Thus, even though the jet pump is activated at time t1, fuel is not being transferred from the passive side to the active side of the tank. Accordingly, at time t2, jet pump degradation is indicated (plot 625). In response to such an indication, mitigating action may be taken to transfer fuel from the passive side to the active side provided such mitigating action is requested or desired, as will be elaborated further below.

Turning now to FIG. 7, a method 700 is shown for coordinating a transfer of fuel from a passive side of a saddle fuel tank to an active side, under conditions where it is determined that a jet pump that functions to transfer fuel from the passive side to the active side has become degraded, and thus is no longer transferring fuel as desired or expected.

Method 700 will be described with reference to the systems described herein and shown in FIGS. 1-3, though it should be understood that similar methods may be applied to other systems without departing from the scope of this disclosure. Method 700 may be carried out by a controller, such as controller 312 in FIG. 3, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-3. The controller may employ actuators such as fuel pump (e.g. 321), jet pump (e.g. 324), fuel injector(s) (e.g. 366), active suspension system (e.g. 111), actuators associated with autonomous vehicle system (see FIG. 2), etc., to alter states of devices in the physical world according to the method depicted below.

Method 700 begins at 705, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 includes indicating whether the jet pump (e.g. 324) that controls the pumping of fuel from the passive side of the saddle tank to the active side, is degraded such that fuel is not being transferred from the passive side to the active side when the jet pump is turned on or activated. As discussed above with regard to FIG. 6, such an indication may be provided in response to an indication that a fuel level in the active side is decreasing while a fuel level in the passive side remains constant, under conditions where the jet pump is activated and the fuel pump (e.g. 321) is also activated. If, at 710, such a determination has not been indicated via the controller, then method 700 may proceed to 715. At 715, method 700 may include maintaining current vehicle operating conditions. For example, if the engine is operating to combust air and fuel, with the jet pump transferring fuel from the passive side to the active side while the fuel pump provides fuel to the fuel rail of the engine, then such operating conditions may be maintained. In other examples, the vehicle may be being propelled via electrical energy, or some combination of engine operation and electrical energy. In such cases, the current vehicle operating status may be maintained. Method 700 may then end.

Returning to 710, in response to an indication that the jet pump is degraded, then method 700 may proceed to 720. At 720, method 700 may retrieve data from a first fuel level indicator (FLI) (e.g. 306) positioned in the active side of the saddle fuel tank, along with data from a second FLI (e.g. 309) positioned in the passive side of the saddle fuel tank.

With the jet pump indicated to be degraded, it may be understood that only the fuel in the active tank may be used to propel the vehicle to a desired destination, unless mitigating action is undertaken to transfer fuel from the passive side to the active side, which will be discussed in further detail below. Thus, depending on the fuel level in the active side of the saddle tank, the vehicle may have enough fuel to reach the desired destination. Alternatively, depending on the fuel level in the active side of the saddle tank and the fuel level in the passive side, there may be enough fuel to reach the desired destination provided that mitigating action is taken to transfer fuel from the passive side to the active side. Such a determination depends on how much fuel would have to be transferred to reach the particular destination, whether there are opportunities (e.g. open parking lots, cloverleaf-shaped highway entrances/exits, roundabouts, etc.) for taking mitigating action to transfer the particular amount of fuel from the passive side to the active side, etc., which will be discussed in further detail below. In the case of a hybrid vehicle such as the vehicle depicted at FIG. 1, there may also be opportunity to use energy stored at the onboard energy storage device to propel the vehicle, as discussed. Thus, the amount of fuel that may have to be transferred to reach such a particular destination may be a function of onboard energy storage. For example, a greater amount of onboard energy storage, a lesser amount of fuel that may have to be transferred to reach a particular destination. Alternatively, the lesser an amount of onboard energy storage, a greater amount of fuel that may have to be transferred to reach a particular destination.

Proceeding to 725, method 700 may include providing one or more potential destinations for the vehicle given the jet pump degradation. In one example, a vehicle operator may have input a desired drive route and destination into an application that communicates (wired or wirelessly) with the controller of the vehicle. For example, such a desired drive route and destination may have been previously selected by the vehicle operator (or a customer/passenger if the vehicle is participating in a car-sharing model and the vehicle is an autonomous vehicle) via the onboard navigation system (e.g. 132), via the vehicle instrument panel (e.g. 196), etc. If such a destination may be reached either via the fuel already present in the active side of the tank, or alternatively, if such a destination may be reached by taking mitigating action to transfer fuel from the passive side to the active side, then such a destination may be provided as a potential destination at 725. As discussed, onboard energy storage at the onboard energy storage device (e.g. 150) may be taken into account in determining whether such a potential destination may be reached, in addition to taking into account the current level of fuel in the active side and an amount of fuel that may be transferred from the passive side to the active side by taking mitigating action to do so.

In another example, the desired drive route and particular destination may comprise a learned route/learned destination for a particular vehicle operator (or a particular customer/passenger in the case that the vehicle is participating in a car-sharing model and the vehicle is an autonomous vehicle). Similar to that discussed above, if the destination may be reached along the learned route either via the fuel already present in the active side of the tank, or alternatively if the destination may be reached by taking mitigating action to transfer fuel from the passive side to the active side (taking into account onboard energy storage in the case of a hybrid vehicle as discussed), then such a destination may be provided as a potential destination at 725.

Along similar lines, the controller may additionally or alternatively suggest one or more potential destinations, based on the indication of the jet pump degradation, the level of fuel in the active and the passive side of the saddle fuel tank, and a level of onboard energy stored at the onboard energy storage device (e.g. 150) in the case of a hybrid vehicle (see FIG. 1). For example, the controller of the vehicle may determine via one or more of the onboard navigation system, V2I2V communications, wireless communication over a wireless network (e.g. 131) with one or more servers, etc., potential destinations whereby the jet pump may be serviced. In another example, the controller of the vehicle may additionally or alternatively suggest potential destinations as filing stations, in order to supply the active tank with fuel in order to then reach a particular destination. For example, the controller may determine that if a particular filling station is reached by the vehicle, where the active side of the tank may be filled with fuel, then a subsequent destination may then be reachable, such as a destination originally identified as a desired destination prior to the jet pump degradation indication. Thus, it may be understood that the one or more potential destinations additionally or alternatively suggested by the controller of the vehicle may differ from the desired/selected/learned destination of the vehicle operator or customer prior to the indication of jet pump degradation. Furthermore, such suggested destinations may be based on the ability of the vehicle to arrive at the suggested destination, either in the absence of mitigating action to transfer fuel from the passive side to the active side, or in conjunction with taking mitigating action to transfer fuel from the passive side to the active side. In other words, one or more of the onboard navigation system, V2V and/or V2I2V communications, wireless communication between the controller of the vehicle and the internet or relevant servers, etc., may be used to identify particular routes that involve certain driving maneuvers (e.g. a sequence of turns, an identified parking lot that allows for particular driving maneuvers such as driving in a circle, etc.) that may transfer fuel from the passive side to the active side of the saddle fuel tank. In some examples, routes identified may include destinations that may be reachable without having to rely on mitigating action to be taken to transfer fuel from the passive side to the active side, whereas in other examples, such routes identified may include destinations that are reachable if mitigating action along such routes are taken to transfer fuel from the passive to active side of the fuel tank.

Thus, it may be further understood that particular destinations may be excluded from being provided as potential destinations if the controller 1) determines that the amount of fuel in the active side, even if combined with fuel transferred from the passive side to the active side and taking into account the level of onboard energy storage at the onboard energy storage device (e.g. 150), is not sufficient to reach such a destination, or 2) if the amount of fuel in the active side is not sufficient on its own to reach such a destination (also taking into account onboard energy storage level where applicable), but that there are not good opportunities (e.g. no identifiable routes that allow for adequate transfer of fuel from the passive side to the active side) for taking mitigating action to transfer fuel from the passive side to the active side.

Said another way, it may be understood that the suggested route and/or series of maneuvers may take into account the desired destination, fuel level in the active side of the tank and fuel level in the passive side of the tank, amount of fuel determined to be required in the active side of the tank in order to reach the desired destination, amount of fuel expected to be transferred from the passive side to the active side by travelling the selected route and/or conducting the series of maneuvers, level of onboard energy storage (where applicable), etc. The controller may make use of computer assisted drawing (CAD) renderings of the fuel tank in order to determine the suggested route and/or series of maneuvers, in order to ensure that by travelling the suggested route and/or by conducting the series of maneuvers, an appropriate amount of fuel may be transferred from the passive side of the tank to the active side of the tank to enable the vehicle to reach the desired destination.

For example, the controller may calculate, based on the desired destination, how much fuel in the active tank is likely to enable the vehicle to reach a desired destination. If such an amount is less than what is currently in the active side, the controller may then, based on CAD modeling of the fuel tank and the amount of fuel in the active side and the passive side, communicate with the onboard navigation system to identify particular routes and/or driving maneuvers that may be undertaken which are likely to transfer a desired amount of fuel desired from the passive side to the active side of the tank. The controller may employ the use of V2V, V2I2V, etc., in order to determine what types of driving maneuvers may be appropriate. For example, certain driving maneuvers and/or routes may be prevented from being provided as an option, based on proximity to other vehicles, for example a parking lot that is too crowded with vehicles to enable the conducting of certain driving maneuvers, roads for which traffic is moving too slowly for particular driving maneuvers to be effective at transferring the desired amount of fuel from the passive side to the active side of the tank, presence of obstacles in an area which otherwise would be desirable to conduct driving maneuvers to transfer the desired amount of fuel, etc.

Accordingly, at 725 the controller may provide an ability for the vehicle operator or passenger (in the case of an autonomously operated vehicle) to select a desired destination, for example by providing such selection options either via the onboard navigation system or via the instrument panel (e.g. 196), for example via a human machine interface (HMI). Alternatively, the vehicle may be equipped with voice recognition capability, which may enable a customer or vehicle operator to audibly select a desired destination, and in some examples the selection options may also be audibly provided. In the case of an autonomously operated vehicle that does not have any passengers in the vehicle, the controller of the vehicle may select the desired destination from the selection options without passenger input.

Thus, in situations where the vehicle is occupied, an alert may be communicated to the vehicle operator or customer, the alert comprising one or more of an audible alert, an alert displayed via the instrument panel, etc., such that the vehicle operator or passenger receives information that the jet pump is degraded and that the current drive cycle route may have to be potentially altered in some way. Next, a further alert may be provided to the vehicle operator or customer, suggesting potential destinations due to the fact the jet pump is degraded, as discussed above. In other words, it is herein recognized that in some examples a particular vehicle operator or customer may not have time to deliver the vehicle to a service station, and in such an example the vehicle operator may opt to instead fuel the active side of the saddle tank at a nearby filing station, such that the vehicle may have enough fuel to get to another desired destination, such as a destination where an important meeting is happening, etc. In another example, a particular vehicle operator may have a service that provides a particular number of tows free of charge per year, and thus such a vehicle operator may be more inclined to bring the vehicle to their home or other destination, and then have the vehicle picked up by the service and towed to a particular service shop, rather than traveling directly to such a service shop. In a case where the vehicle is participating in a car-sharing model and where the vehicle comprises an autonomous vehicle, one or more of the potential destinations may comprise destinations where another vehicle may be picked up such that the customer may continue to their desired destination. The autonomous vehicle may then autonomously determine an appropriate destination for the vehicle based on fuel levels in the active and passive sides and level of onboard energy storage (in the case of a hybrid vehicle), in addition to current traffic conditions, proximity to filling stations and/or service stations, availability of routes that enable adequate transfer of fuel from the passive to active side of the saddle fuel tank, etc., such that the vehicle may reach a particular desired destination.

Accordingly, proceeding to 727, method 700 may include the controller receiving the destination selection. For example, in the case where the vehicle is occupied, an audible selection may be made via the vehicle operator/customer and received via the controller, or the selection may be made by the vehicle operator/customer inputting their choice via the onboard navigation system, the vehicle instrument panel, etc. In the case where the vehicle comprises an autonomous vehicle and there are no occupants in the vehicle, the selection may be determined autonomously via the controller itself, as discussed above.

With the particular destination received via the controller at 727, method 700 may proceed to 730. At 730, method 700 may include indicating whether an amount of fuel in the active side of the fuel tank is sufficient to reach the particular selected destination. In other words, the controller may take into account the desired destination, suggested route as provided via the onboard navigation system, for example, and fuel level in the active side of the tank (in conjunction with onboard energy storage level in the case of hybrid vehicles) in order to infer whether the particular desired destination comprises a destination for which there is determined to be enough fuel in the active side to enable the vehicle to reach the selected destination. If so, then method 700 may proceed to 745 where method 700 includes querying as to whether the destination has been reached. In other words, no mitigating action may be taken to transfer any fuel from the passive side to the active side of the tank, and the route provided may thus not include specific sequences of vehicle maneuvers, etc., to transfer fuel from the passive to active side of the tank. However, it may be understood that such routes may be selected to minimize or avoid altogether the possibility of transfer of fuel from the active side to the passive side of the fuel tank. If, at 745, the selected destination has not been indicated to be reached, then method 700 may continue to monitor fuel level in the active side along with number of expected/predicted miles to selected destination in order to ensure that the destination may be reached without mitigating action being taken to transfer any fuel from the passive side to the active side of the saddle tank.

In response to the destination being reached, method 700 may proceed to 750, where vehicle operating conditions are updated. For example, in a case where no mitigating action was taken to transfer any fuel from the passive side to the active side, then the fuel level in the active side may be updated upon arrival at the destination. Furthermore, depending on the destination, a flag may be set at the controller triggering the controller to implement the methodology of FIG. 7 again upon request to proceed to another destination. For example, in a situation where the vehicle traveled to a filling station in order to reach another destination, fuel level may be updated and it may again be determined at the next vehicle startup event whether there is enough fuel in the active side of the fuel tank to reach a desired destination (selected by a vehicle operator or passenger or autonomously via the controller), or whether mitigating action may be requested in order to transfer fuel from the passive side to the active side of the fuel tank to reach the desired destination. In another example where the destination includes a service station, vehicle operating conditions such as fuel level, etc., may be updated upon arrival, and subsequent to the jet pump being repaired, any diagnostic trouble codes associated with the degraded jet pump may be cleared. In still other examples, where the destination includes neither a filling station nor a service station, current fuel level in the active tank may be updated, and a flag may be set to trigger the method to initiate once again upon a subsequent vehicle-on event, in order to determine whether the amount of fuel in the active tank is sufficient to reach another destination, or whether mitigating action may be taken in order to do so.

Returning to 730, in a case where the amount of fuel in the active side is determined to not be sufficient to reach the particular destination selected by the vehicle operator or, in the case of an autonomous vehicle that is unoccupied, selected via the vehicle controller, method 700 may proceed to 735. At 735, the controller may provide instructions for taking mitigating action to transfer fuel from the passive side to the active side, in order to enable the vehicle to reach the selected destination.

The instructions for taking mitigating action may be based on the desired destination and route identified as discussed above, and may involve the controller communicating with the onboard navigation system and/or one or more servers and/or infrastructures in order to provide instructions to guide the vehicle along such a route and/or series of driving maneuvers which are expected to transfer at least an amount of fuel from the passive tank to the active tank to enable the vehicle to reach the desired destination. In the case of an autonomous vehicle, the controller may control the vehicle autonomously along the selected route and/or series of driving maneuvers. Alternatively, in the case where the vehicle is being operated via an operator/customer, the onboard navigation system and/or controller may provide instructions in the form of audible commands and/or commands on the vehicle instrument panel in order to enable the vehicle to be driven along the selected route and/or series of maneuvers.

As a specific example, consider a vehicle that is traveling along a particular route when it is determined via the controller that the jet pump is not effectively transferring fuel from the passive side to the active side of the tank, and that in order to reach a desired/selected destination, mitigating action may have to be taken in order to transfer fuel from the passive side to the active side of the tank. The controller, in conjunction with one or more of data retrieved from the onboard navigation system, V2V/V2I2V communications, wireless communication between the controller and relevant servers or internet websites, CAD modeling of the fuel tank, fuel level in both the active and passive sides of the tank, fuel level in the active side of the tank determined to be required to reach the desired/selected destination, level of onboard energy storage, etc., may determine a particular route and/or series of driving maneuvers which may enable a desired amount of fuel to be transferred to the active side of the tank. The selected route may be based on whether the active side of the tank is positioned on the right side of the vehicle or the left side of the vehicle (when looking at the vehicle from the rear). Specifically, in the case where the active side of the tank is on the left side of the vehicle, left turns and/or maneuvers involving the vehicle turning to the left may be avoided, as such maneuvers would undesirably transfer fuel from the active side to the passive side of the tank. Alternatively, in the case where the active side of the tank is on the right side of the vehicle (when looking at the vehicle from the rear), right turns and/or maneuvers involving the vehicle turning to the left may be avoided, as such maneuvers would similarly undesirably transfer fuel from the active side to the passive side of the tank.

Turning to FIG. 9A, such an example 900 is schematically depicted. FIG. 9A depicts the vehicle system 100, where inset 920 illustrates that the fuel tank of the vehicle includes the passive side (e.g. 340) on the left hand side of the vehicle and the active side on the right hand side of the vehicle as viewed from a rear of the vehicle (as in FIG. 4B). The vehicle is depicted as traveling along route 905. However, at a certain point along route 905, depicted as 910, the controller determines that the jet pump is degraded, and is thus not effectively transferring fuel from the passive side to the active side of the tank. Accordingly, the method of FIG. 7 is used to suggest potential routes and/or driving maneuvers to enable the vehicle to reach a desired/selected destination. In this example illustration, the desired/selected destination comprises destination 922. Destination 922 comprises the same destination that the vehicle was attempting to reach, upon the indication of degradation of the jet pump. In other words, example illustration 900 depicts a situation where, upon indication of degradation of the jet pump, the vehicle operator/customer selects the desired destination to remain destination 922, even though jet pump degradation has been indicated. For illustrative purposes, destination 922 comprises a place of employment for the vehicle operator/customer in this example. Furthermore, for example illustration 900 it may be understood that there is a vehicle operator that is providing the input commands to propel the vehicle, rather than a vehicle that is autonomously operated.

In the absence of degradation of the jet pump, the selected route to reach the desired destination 922 comprises the route depicted by 905*a*. However, due to the jet pump degradation, and fuel level in the active side of the tank, the controller determines that if the route 905*a* were maintained, then there would not be sufficient fuel in the active tank to reach the destination 922 (also taking into account onboard energy storage level). Accordingly, the controller suggests route 905*b*. Specifically, route 905*b* takes advantage of a parking lot 930 that is determined via one or more of the onboard navigation system, V2V/V2I2V communications, wireless communication between the controller and one or more relevant internet servers, etc., to be free from obstacles such that a series of circular driving maneuvers may be performed in order to transfer the desired amount of fuel from the passive side to the active side of the tank. The controller further determines how many of the circular driving maneuvers to conduct, such that circular driving maneuvers in excess of what is deemed to be sufficient for transferring the desired amount of fuel from the passive side to the active side, are not conducted. The controller further determines a circumference of the circular driving maneuvers to be conducted, and still further determines a speed or speed range for the vehicle when conducting the circular driving maneuvers. In this example illustration 900, the controller further determines that if the vehicle is tilted a predetermined amount via the active suspension such that the right side 404 of the vehicle becomes lower to the ground than the left side 406 of the vehicle (when viewed from the rear as depicted by inset 932), then three circular driving maneuvers of the defined circumference and at the determined speed may be sufficient to transfer the desired amount of fuel from the passive to active side, to enable the vehicle to have enough fuel in the active side to reach the desired destination 922.

Accordingly, in this example illustration 900, because the vehicle is being operated via an operator/customer, audible commands and/or commands displayed on the vehicle instrument panel are provided under control of the controller, to direct the vehicle operator to propel the vehicle along path 905b, in the manner depicted by arrows 925. Specifically, upon the vehicle entering into parking lot 930, the vehicle is tilted as illustrated by inset 932, and the vehicle operator is directed via the audible commands and/or commands displayed on the vehicle instrument panel to conduct three circular motions 935 under the direction of the controller and/or in conjunction with the onboard navigation system. After conducting the three circular motions 935, the controller may determine the level of fuel in the active side of the tank, to assess how much fuel was transferred from the passive side to the active side and to infer whether there is enough fuel in the active side to reach the desired destination 922. In examples where the vehicle was tilted to further encourage the transfer of fuel from the passive to active side, to accurately assess fuel level in the active side of the tank, the vehicle may be returned to its original position prior to being tilted, prior to determining fuel level in the active side of the tank. In the case that there is still not enough fuel in the active side of the tank to reach destination 922, additional routes, destinations, and/or driving maneuvers may be suggested via the controller. Alternatively, in response to an indication that there is likely enough fuel in the active side of the tank to reach destination 922, audible commands and/or commands displayed via the vehicle instrument panel may be generated to guide the vehicle operator to propel the vehicle along route 905b in the direction of arrows 925 to reach destination 922.

It may be understood that in some examples, in an attempt to reach the desired destination by travelling the suggest route (e.g. 905b) and/or by conducting a particular series of driving maneuvers (e.g. driving in a circle), overall fuel economy may be lowered or degraded as opposed to traveling the route initially desired (e.g. 905a). However, such a fuel economy penalty may be acceptable to a vehicle operator/customer, as opposed to the vehicle running out of fuel, needing to be towed from an undesirable location, etc.

In the case of example illustration 900, the suggested route and series of circular driving maneuvers was deemed by the controller sufficient for transferring the desired amount of fuel from the passive side to the active side to reach the desired destination 922. However, in some examples, the suggested route may further be generated in order to avoid any right turns at all, or to minimize the number of right turns such that any amount of fuel that could potentially be transferred from the active side of the tank to the passive side, may be reduced or avoided altogether. For example, there may be circumstances where rather than conducting a series of circular driving motions, a particular route may be deemed sufficient to transfer enough fuel from the passive side to the active side just based on a number of left turns encountered along such a route (and by minimizing a number of right turns), for the case where the fuel tank includes the active side on the right side of the vehicle when viewed from the rear (see inset 932). In other cases, such a route may be combined with a series of circular driving motions such as that depicted as 935, to further encourage transfer of fuel from the passive to active side of the fuel tank. It may be understood that in some examples, circular driving motions may not be conducted in a parking lot or other open similar open space, but rather may be conducted at one or more roundabouts along a particular suggest route.

While example illustration 900 depicted a situation where a vehicle operator was providing the input commands to propel the vehicle, and thus the vehicle was controlled along the suggested route 905b via audible instructions and/or instructions displayed on via the vehicle instrument panel, in other examples where the vehicle is autonomously controlled it may be understood that the vehicle controller may autonomously control the vehicle along suggested route 905b.

Turning now to FIG. 9B, another example illustration 950 is depicted, illustrating vehicle system 100 traveling along path 952 when at a time depicted as 955, the controller determines that the jet pump is no longer effectively transferring fuel from the passive side to the active side of the fuel tank. In this example illustration, the active side 350 of the fuel tank is on the left side 406 of the vehicle and the passive side 340 of the fuel tank is on the right side 404 of the vehicle, when viewed from the rear of the vehicle (see FIG. 4A and inset 960). Accordingly, in such an example, when the vehicle turns to the right, fuel may be transferred from the passive side to the active side. Alternatively, if the vehicle were to turn to the left, there is the potential for fuel to be undesirably transferred from the active side to the passive side of the tank.

Figure 2:
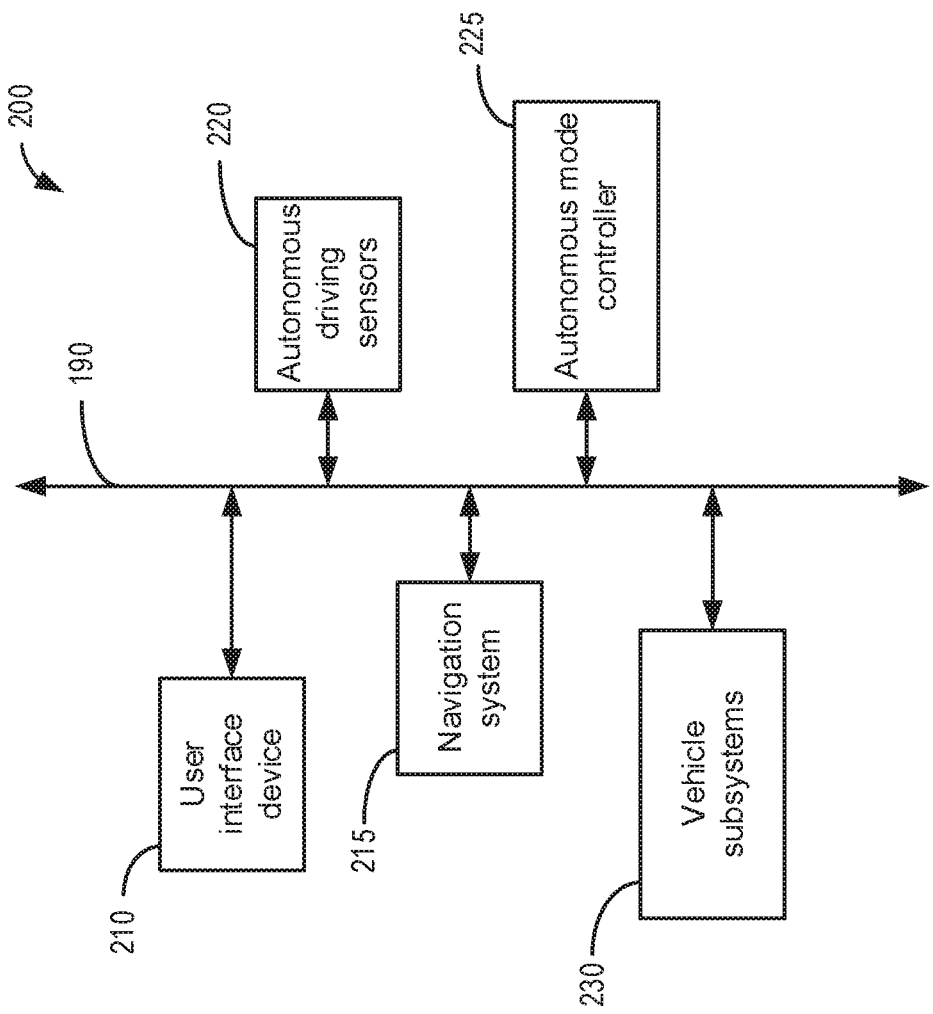
FIG. 2 schematically illustrates a block diagram of an example system for an autonomous vehicle.

In example illustration 950, it may be understood that the vehicle is operating autonomously or in other words, is being controlled via the autonomous driving system depicted at FIG. 2. It may be further understood that in example illustration 950, there are no customers/passengers in the vehicle. Such a determination may be made via seat load cells, onboard cameras, etc. Thus, in response to the indication of the jet pump being degraded as identified by numeral 955, alternative destinations and/or alternative driving routes are determined that may enable the vehicle to arrive at a particular destination, either with or without taking mitigating action to transfer fuel from the passive to active side of the tank.

In this example timeline 950, it may be understood that the controller of the autonomous vehicle selects to maintain the desired destination as the original desired destination. While not explicitly illustrated, it may be understood that in order to reach the original desired destination, the vehicle was traveling along a straight path depicted by arrow 952*a*. Thus, it is desirable for the vehicle to continue along the path depicted by arrow 952*a*, if possible. In this example illustration 950, the controller, in conjunction with the onboard navigation system, fuel level in the passive side and the active side of the fuel tank, CAD model(s) of the fuel tank stored at the controller, V2V/V2I2V communications, wireless communication between the controller and one or more servers, internet web sites, etc., the controller determines that if path 952*a* were to be travelled by the vehicle without mitigating action being taken, the vehicle may not have enough fuel to reach the desired destination. However, the controller further determines that due to the configuration of the highway 957 that the vehicle is traveling on, an alternative route taken by the vehicle may enable a sufficient amount of fuel to be transferred from the passive side to the active side to enable the vehicle to reach the desired destination. Accordingly, referring to example 950, the alternative suggested route comprises the path depicted as 952*b*. More specifically, due to the clover-shaped configuration of the highway, the controller determines that the vehicle may readily conduct a series of right hand turns which may serve to transfer the desired amount of fuel from the passive side to the active side of the fuel tank. Furthermore, it is determined via the controller that by tilting the vehicle via the active suspension such that the left side of the vehicle is lowered in relation to the right side of the vehicle, as depicted by inset 960, fuel may be further encouraged to be transferred from the passive side to the active side of the tank during the time that the vehicle is conducting the series of right hand turns. For both FIGS. 9A and 9B, it may be determined that an amount whereby the vehicle is tilted may be a function of desired amount of fuel to be transferred from passive to active side, fuel levels in both sides of the tank, speed at which particular driving maneuvers are determined/suggested to be performed, etc. In this way, the controller may make a logical determination of an extent to which the vehicle may be tilted to achieve the desired amount of fuel transfer.

Thus, by routing the vehicle along path 952*b* in the direction of arrows 965, fuel may be transferred from the passive side of the tank to the active side such that the desired destination may be reached.

Accordingly, FIGS. 9A-9B depicted example illustrations for how instructions may be provided to a vehicle operator/customer, or in other examples to autonomously control a vehicle, along particular routes and/or via the conducting of one or more series of driving maneuvers, such that sufficient fuel may be transferred from the passive side of the saddle fuel tank to the active side of the tank to reach the desired destination. Thus, returning to FIG. 7 at step 735, in response to such instructions being provided, method 700 may proceed to 740, where it may be determined if the mitigating action suggested has been taken. If so, method 700 may return to step 730 where it may be determined as to whether there is now enough fuel to reach the desired destination, as discussed. If not, further instructions may be provided to further transfer fuel to the active side of the tank. Such further instructions may in some examples further include providing additional suggestions for desired destination, routes, etc.

Alternatively, in response to the amount of fuel being indicated to be sufficient to reach the desired destination at 730, method 700 may proceed to 745 where it is determined if the desired destination has been reached. If not, the controller may continue to assess whether the amount of fuel in the active side is sufficient for reaching the desired destination as discussed above. Alternatively, in response to the destination being reached, method 700 may proceed to 750, where vehicle conditions are updated. For example, fuel level in the active and passive sides of the fuel tank may be updated. If the desired destination does not comprise a service shop, then a flag may be set at the controller to trigger the method to reinitiate method 700 at a subsequent vehicle startup event, where further potential destinations, routes, etc., may be provided in order to allow the vehicle to reach, for example a filling station or service station, etc.

Thus, the method of FIG. 7 may enable a method comprising conducting a driving maneuver in response to an indication that a jet pump that functions to transfer a fuel from a passive side to an active side of a saddle fuel tank that supplies the fuel to an engine of a vehicle is degraded, the driving maneuver including transferring a fuel amount from the passive side to the active side. The indication that the jet pump is degraded may include an indication that a first fuel level in the active side is decreasing and that a second fuel level in the passive side is maintained constant, under conditions where the jet pump is activated and the fuel is further being pumped to the engine for combustion via a fuel pump positioned in the active side of the saddle fuel tank.

In such a method, the driving maneuver may be based on a positioning of the active side and the passive side of the saddle fuel tank in relation to the vehicle. For example, the driving maneuver based on the positioning of the active side and the passive side may further comprise at least conducting left-handed turns as viewed from a rear of the vehicle when the active side is on a right-hand side of the saddle fuel tank as viewed from the rear of the vehicle, and conducting right-handed turns as viewed from the rear of the vehicle when the active side is on a left-hand side of the saddle fuel tank as viewed from the rear of the vehicle.

In such a method, the method may further comprise actively tilting the vehicle a predetermined amount by lowering a side of the vehicle closest to the active side of the saddle fuel tank and raising a different side of the vehicle closer to the passive side in order to encourage the transfer of the fuel amount from the passive side to the active side while conducting the driving maneuver. Conducting the driving maneuver may be via a vehicle operator, or via an autonomous control system of the vehicle.

In such a method, a set of instructions for conducting the driving maneuver may be provided via a controller of the vehicle, the instructions based on information obtained via an onboard navigation system related to the driving maneuver. The fuel amount may be based on an amount of fuel that will allow the vehicle to reach a particular destination. Furthermore, conducting the driving maneuver may comprise controlling a speed of the vehicle while conducting the driving maneuver.

Another method for a vehicle may comprise responsive to an indication that a jet pump that functions to transfer a fuel from a passive side to an active side of a saddle fuel tank is degraded, propelling the vehicle along a route that is predicted to result in a transfer of the fuel from the passive side to the active side to enable the vehicle to reach a desired destination in lieu of the jet pump. In such a method, the desired destination may be selected via a vehicle operator under circumstances where the vehicle is not controlled autonomously. In another example, the desired destination may be selected via a passenger under circumstances where the vehicle is controlled autonomously and where the vehicle is occupied by the passenger. In yet another example, the desired destination may be autonomously selected under circumstances where the vehicle is controlled autonomously and where the vehicle is unoccupied.

In such a method, the route may include one or more driving scenarios that result in a passive transfer of fuel from the passive side to the active side of the saddle fuel pump, the passive transfer of fuel comprising a quantity of fuel that is sufficient to enable the vehicle to reach the desired destination. The route may minimize the passive transfer of fuel from the active side to the passive side of the saddle fuel pump. Such a method may further comprise controlling a tilting of the vehicle via an active suspension during the one or more driving scenarios to further encourage the passive transfer of fuel from the passive side to the active side. Furthermore, the one or more driving scenarios may be based on a direction of centrifugal force being in a direction of the active side of the saddle fuel tank and away from the passive side of the fuel tank while the vehicle is in the process of conducting the one or more driving scenarios.

In such a method, the route may not result in the transfer of fuel from the passive side to the active side under conditions where an amount of fuel in the active side is determined to be sufficient to enable the vehicle to reach the desired destination without any transfer of fuel from the passive side to the active side. Furthermore, the route may be developed via an onboard navigation system of the vehicle based on one or more of the desired destination, current levels of the fuel in the active side and the passive side of the saddle fuel tank, and computer assisted drawing(s) of the saddle fuel tank.

Turning now to FIG. 8, an example timeline 800 is depicted, illustrating how mitigating action may be taken to transfer fuel from a passive side to an active side of a saddle fuel tank, in response to an indication that a jet pump (e.g. 324) is not functioning as desired or expected. Timeline 800 includes plot 805, indicating fuel level in the active side (e.g. 350) of the fuel tank as monitored by a first fuel level sensor (e.g. 306), and plot 810, indicating fuel level in the passive side (e.g. 340) of the fuel tank as monitored by a second fuel level sensor (e.g. 309), over time. Timeline 800 further includes plot 815, indicating whether a fuel pump (e.g. 321) that functions to supply fuel to fuel injectors (e.g. 366) of the engine (e.g. 110) is on or off, and plot 820, indicating whether the jet pump that functions to transfer fuel from the passive side to the active side of the fuel tank is on or off, over time. Timeline 800 further includes plot 825, indicating whether jet pump degradation is indicated (yes or no), over time. Timeline 800 further includes plot 830, indicating whether mitigating action is being undertaken in order to transfer fuel from the passive side of the fuel tank to the active side, over time. Timeline 800 further includes plot 835, indicating whether the vehicle is tilted (yes or no), over time, the tilting employed to further encourage fuel to be transferred from the passive side to the active side of the fuel tank.

At time t0, the jet pump is on (plot 820) as is the fuel pump (plot 815). Jet pump degradation is not yet indicated (plot 825), and thus mitigating action is not yet being undertaken in order to transfer any fuel from the passive side of the tank to the active side (plot 830). The vehicle has not been tilted to any degree via the suspension (plot 835). The active side of the tank includes an indicated amount of fuel (plot 805), and the passive side of the tank also includes an indicated level of fuel (plot 810).

Between time t0 and t1, fuel level in the active side of the tank decreases, while the fuel level in the passive side of the tank is maintained constant. This would not be expected if the jet pump were functioning as desired, as in a case where the jet pump were functioning as desired, fuel level in the active side may be maintained more or less constant while fuel level in the passive side of the tank may decrease. Accordingly, at time t1 it is inferred by the controller that the jet pump is not functioning as desired (plot 825), or in other words, is not functioning to transfer fuel from the passive side to the active side of the tank. With the jet pump indicated to be degraded, the jet pump is turned off at time t1 via a command from the controller, actuating it off. Furthermore, while not explicitly illustrated, it may be understood that method 700 is utilized responsive to the indication of jet pump degradation, to determine fuel level in the active and passive sides of the tank and current desired destination, such that it may be determined as to whether the vehicle may reach the current desired destination without mitigating action to transfer fuel from the passive side to the active side of the tank. In this example timeline, it may be understood that the controller determines that the vehicle may not reach the current desired destination if mitigating action is not undertaken. In other words, the controller determines that in the absence of mitigating action being taken, the active side may become starved of fuel prior to reaching the current desired destination. While not explicitly illustrated, it may be understood that the determination may be further based on onboard energy storage level in the case that the vehicle comprises a hybrid vehicle, as discussed above.

Thus, the controller in conjunction with the onboard navigation system, CAD model(s) of the fuel tank stored at the controller, current fuel level in both the active and passive sides of the fuel tank, V2V/V2I2V communications, wireless communication between the controller and relevant internet web sites and/or servers, level of onboard energy storage (where applicable), etc., suggests potential destinations along with potential routes to travel that may enable the vehicle to reach such potential destinations. It may be understood that some suggested destinations may comprise destinations that do not involve the taking of mitigating action. Alternatively, other suggested destinations may comprise destinations that may be reached under circumstances where mitigating action is taken to transfer some amount of fuel from the passive side of the tank to the active side. As discussed above, such suggested destinations and/or routes may be communicated to the vehicle operator/customer audibly, via an HMI associated with the vehicle instrument panel, etc. This may enable the vehicle operator/customer to select which option they prefer. Alternatively, in the case of an autonomously operated vehicle that does not have passengers/customers in the vehicle at the time, the selection may be made by the controller. In this example timeline 800 it may be understood that the vehicle is being driven by an operator.

Accordingly, while not explicitly illustrated, it may be understood that between time t1 and t2, the vehicle operator selects a particular destination that involves the taking of mitigating action to transfer fuel from the passive side to the active side of the tank, in order to reach the particular destination. Thus, beginning at time t2 one or more of audible commands and/or commands via the HMI associated with the vehicle instrument panel are provided to the vehicle operator such that the vehicle may be controlled along a particular path that serves to transfer the desired amount of fuel from the passive side to the active side of the tank. In this example timeline, it may be understood that the mitigating action involves the conducting of a series of circular driving maneuvers of a determined circumference at a determined vehicle speed in a parking space that has sufficient room for such maneuvers to be conducted. Furthermore, in this example timeline, it may be understood that the vehicle has a fuel tank with the active side of the tank on the right hand side of the vehicle when viewed from the rear, as depicted at FIG. 4B and FIG. 9A. Thus, the series of circular driving maneuvers involves turning to the left as depicted at FIG. 9A, such that fuel may be transferred from the passive side of the tank to the active side.

Between time t2 and t3 thus, it may be understood that the vehicle is proceeding with traveling to the parking lot where the circular driving maneuvers are to be conducted. Between time t2 and t3, there are not driving maneuvers that transfer a significant amount of fuel from the passive side to the active side, and thus the fuel level in the active side declines slightly (plot 805), while fuel level in the passive side remains essentially constant (plot 810). However, at time t3, it may be understood that the vehicle has reached the parking lot in order to conduct the circular driving maneuvers. Accordingly, the controller has further determined that a particular number of circular driving maneuvers may be conducted under conditions where the vehicle is tilted (see inset 932 at FIG. 9A) a predetermined amount. In other words, the number of circular driving maneuvers may be lowered by also tilting the vehicle as indicated at the inset 932 at FIG. 9A, as compared to a situation where the tilting of the vehicle is not conducted.

Thus, at time t3, the controller commands the active suspension to tilt the vehicle the predetermined amount (plot 835). Between time t3 and t4, the circular driving maneuvers are conducted, which results in the amount of fuel in the active side increasing (plot 805) and the amount of fuel in the passive side decreasing (plot 810). It may be understood that in providing potential suggestions of destinations, driving routes, etc., it may be determined a threshold fuel level for the active side of the tank for reaching particular suggested destinations. In this example timeline, it may be understood that the controller has specified that the amount of fuel in the active side of the tank that may enable the vehicle to reach the selected destination comprises threshold fuel level 806, represented as a dashed line. By time t4 the fuel level in the active side of the tank has reached the threshold fuel level that may enable the vehicle to reach the selected destination (plot 805). Accordingly, at time t4 the vehicle is returned to its original state prior to the tilting of the vehicle, as commanded via the controller communicating with relevant actuators of the active suspension system (plot 835). After time t4, the vehicle continues to travel along the driving route specified for the mitigating action, without having to conduct further circular maneuvers. However, it may be understood that in continuing on the suggested route to the desired destination, the path may be selected via the controller as a path that minimizes right hand turns so that any undesirable transfer of fuel from the active side to the passive side of the tank may be avoided as much as reasonably possible. In a case where a particular route may involve some level of fuel transfer from the active side of the tank to the passive side, then such fuel transfer may be compensated by additional circular maneuvers or other maneuvers that function to transfer fuel from the passive side to the active side of the fuel tank.

While the above-discussed description centers on the use of an onboard navigation system to develop particular routes that may transfer desired amounts of fuel from the passive side to the active side, it may be understood that not all vehicles may include such an onboard navigation system. Thus, it is herein recognized that in some examples where a jet pump is indicated to be degraded, a generic message may be provided to the vehicle operator instructing the operator to drive to a nearby parking lot and conduct a series of circular driving maneuvers in order to transfer fuel from the passive side to the active side. In such an example, the vehicle operator may rely on a fuel level indicator and their knowledge of where they are intending to go, in order to determine whether a particular number of circular turns or other driving sequences is sufficient to be able to reach their desired destination.

In this way, in response to an indication of jet pump degradation, a vehicle may be enabled to reach a desired destination in lieu of the jet pump. By taking such mitigating action that involves the transfer of fuel from the passive side to the active side of a saddle fuel tank, the vehicle may avoid having to be towed, which may save on costs associated with the jet pump degradation. Customer satisfaction may be improved, as the customer may be provided with means for reaching a desired destination under conditions where the particular customer would otherwise be stranded.

The technical effect is to recognize that for vehicles equipped with onboard navigation capabilities and further with the ability to predict and develop various routes to reach particular desired destinations, particular routes may be suggested that are determined to be able to transfer at least a determined amount of fuel to the active side of a saddle fuel tank to enable to vehicle to reach such a desired destination. A further technical effect is to recognize that by controlling an active suspension system during the conduction of certain driving maneuvers determined to transfer fuel from the passive to active side of the tank, such fuel transfer may be further encouraged and the amount and/or rate at which fuel is transferred may be increased. A still further technical effect is to recognize that by utilizing an onboard navigation system a number of options may be provided to a vehicle operator or passenger for particular destinations in the event of jet pump degradation, such that the vehicle operator or passenger may select a destination that is most desirable to them. In this way, customer satisfaction may be improved in situations where jet pump degradation occurs.

The systems discussed herein and with regard to FIGS. 1-3, along with the methods discussed herein with regard to FIG. 7, may enable one or more systems and one or more methods. In one example, a method comprises conducting a driving maneuver in response to an indication that a jet pump that functions to transfer a fuel from a passive side to an active side of a saddle fuel tank that supplies the fuel to an engine of a vehicle is degraded, the driving maneuver including transferring a fuel amount from the passive side to the active side. In a first example of the method, the method may further include wherein the indication that the jet pump is degraded includes an indication that a first fuel level in the active side is decreasing and that a second fuel level in the passive side is maintained constant, under conditions where the jet pump is activated and the fuel is further being pumped to the engine for combustion via a fuel pump positioned in the active side of the saddle fuel tank. A second example of the method optionally includes the first example, and further includes wherein the driving maneuver is based on a positioning of the active side and the passive side of the saddle fuel tank in relation to the vehicle. A third example of the method optionally includes any one or more or each of the first and second examples, and further includes wherein the driving maneuver based on the positioning of the active side and the passive side further comprises at least conducting left-handed turns as viewed from a rear of the vehicle when the active side is on a right-hand side of the saddle fuel tank as viewed from the rear of the vehicle; and conducting right-handed turns as viewed from the rear of the vehicle when the active side is on a left-hand side of the saddle fuel tank as viewed from the rear of the vehicle. A fourth example of the method optionally includes any one or more or each of the first through third examples, and further comprises actively tilting the vehicle a predetermined amount by lowering a side of the vehicle closest to the active side of the saddle fuel tank and raising a different side of the vehicle closer to the passive side in order to encourage the transfer of the fuel amount from the passive side to the active side while conducting the driving maneuver. A fifth example of the method optionally includes any one or more or each of the first through fourth examples, and further includes wherein conducting the driving maneuver is via a vehicle operator, or via an autonomous control system of the vehicle. A sixth example of the method optionally includes any one or more or each of the first through fifth examples, and further includes wherein a set of instructions for conducting the driving maneuver are provided via a controller of the vehicle, the instructions based on information obtained via an onboard navigation system related to the driving maneuver. A seventh example of the method optionally includes any one or more or each of the first through sixth examples, and further includes wherein the fuel amount is based on an amount of fuel that will allow the vehicle to reach a particular destination. An eighth example of the method optionally includes any one or more or each of the first through seventh examples, and further includes wherein conducting the driving maneuver further comprises controlling a speed of the vehicle while conducting the driving maneuver.

Another example of a method comprises responsive to an indication that a jet pump that functions to transfer a fuel from a passive side to an active side of a saddle fuel tank is degraded, propelling the vehicle along a route that is predicted to result in a transfer of the fuel from the passive side to the active side to enable the vehicle to reach a desired destination in lieu of the jet pump. In a first example of the method, the method further includes wherein the desired destination is selected by a vehicle operator under circumstances where the vehicle is not controlled autonomously. A second example of the method optionally includes the first example, and further includes wherein the desired destination is selected by a passenger under circumstances where the vehicle is controlled autonomously and where the vehicle is occupied by the passenger; and wherein the desired destination is autonomously selected under circumstances where the vehicle is controlled autonomously and where the vehicle is unoccupied. A third example of the method optionally includes any one or more or each of the first through second examples, and further includes wherein the route includes one or more driving scenarios that result in a passive transfer of fuel from the passive side to the active side of the saddle fuel pump, the passive transfer of fuel comprising a quantity of fuel that is sufficient to enable the vehicle to reach the desired destination; and wherein the route minimizes the passive transfer of fuel from the active side to the passive side of the saddle fuel pump. A fourth example of the method optionally includes any one or more or each of the first through third examples, and further comprises controlling a tilting of the vehicle via an active suspension during the one or more driving scenarios to further encourage the passive transfer of fuel from the passive side to the active side. A fifth example of the method optionally includes any one or more or each of the first through fourth examples, and further includes wherein the one or more driving scenarios are based on a direction of centrifugal force being in a direction of the active side of the saddle fuel tank and away from the passive side of the fuel tank while the vehicle is in the process of conducting the one or more driving scenarios. A sixth example of the method optionally includes any one or more or each of the first through fifth examples, and further includes wherein the route does not result in the transfer of fuel from the passive side to the active side under conditions where an amount of fuel in the active side is determined to be sufficient to enable the vehicle to reach the desired destination without any transfer of fuel from the passive side to the active side. A seventh example of the method optionally includes any one or more or each of the first through sixth examples, and further includes wherein the route is developed via an onboard navigation system of the vehicle based on one or more of the desired destination, current levels of the fuel in the active side and the passive side of the saddle fuel tank, and computer assisted drawing(s) of the saddle fuel tank.

An example of a system for a vehicle comprises a saddle fuel tank for storing a fuel that includes an active side with a fuel pump that supplies the fuel from the active side to an engine for combustion, and a jet pump that transfers the fuel from a passive side of the saddle fuel tank to the active side; an onboard navigation system; an autonomous vehicle system; and a controller with computer readable instructions stored on non-transitory memory that when executed, cause the controller to: indicate degradation of the jet pump in response to a first fuel level in the active side decreasing while a second fuel level in the passive side is maintained constant under conditions where both the fuel pump and the jet pump are activated; request from the onboard navigation system a plurality of routes and associated destinations for the vehicle, the routes specified to include one or more driving scenarios predicted to result in a transfer of the fuel from the passive side to the active side under conditions where the associated destinations are determined not able to be reached via the vehicle based on the first fuel level in the active side; receive a selection as to a desired destination from one of the plurality of routes and associated destinations; provide a set of instructions to enable the vehicle to be propelled along a route associated with the desired destination; and propel the vehicle via the set of instructions along the route associated with the desired destination via the autonomous vehicle system in order to reach the desired destination. In a first example of the system, the system may further include wherein the controller stores further instructions to receive the selection from a passenger of the vehicle via a human machine interface under conditions where the vehicle is occupied via the passenger, or where the controller stores further instructions to select the desired destination from one of the plurality of routes and associated destinations under conditions where the vehicle is unoccupied. A second example of the system optionally includes the first example, and further comprises an active suspension system; and wherein the controller stores further instructions to control a tilting of the vehicle during the one or more driving scenarios via the active suspensions system to encourage a greater amount of fuel transfer from the passive side to the active side as compared to not controlling the tilting of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
conducting a driving maneuver in response to an indication that a jet pump that functions to transfer a fuel from a passive side to an active side of a saddle fuel tank that supplies the fuel to an engine of a vehicle is degraded, the driving maneuver including transferring a fuel amount from the passive side to the active side.

2. The method of claim 1, wherein the indication that the jet pump is degraded includes an indication that a first fuel level in the active side is decreasing and that a second fuel level in the passive side is maintained constant, under conditions where the jet pump is activated and the fuel is further being pumped to the engine for combustion via a fuel pump positioned in the active side of the saddle fuel tank.

3. The method of claim 1, wherein the driving maneuver is based on a positioning of the active side and the passive side of the saddle fuel tank in relation to the vehicle.

4. The method of claim 3, wherein the driving maneuver based on the positioning of the active side and the passive side further comprises at least conducting left-handed turns as viewed from a rear of the vehicle when the active side is on a right-hand side of the saddle fuel tank as viewed from the rear of the vehicle; and
conducting right-handed turns as viewed from the rear of the vehicle when the active side is on a left-hand side of the saddle fuel tank as viewed from the rear of the vehicle.

5. The method of claim 1, further comprising actively tilting the vehicle a predetermined amount by lowering a side of the vehicle closest to the active side of the saddle fuel tank and raising a different side of the vehicle closer to the passive side in order to encourage the transfer of the fuel amount from the passive side to the active side while conducting the driving maneuver.

6. The method of claim 1, wherein conducting the driving maneuver is via a vehicle operator, or via an autonomous control system of the vehicle.

7. The method of claim 1, wherein a set of instructions for conducting the driving maneuver are provided via a controller of the vehicle, the instructions based on information obtained via an onboard navigation system related to the driving maneuver.

8. The method of claim 1, wherein the fuel amount is based on an amount of fuel that will allow the vehicle to reach a particular destination.

9. The method of claim 1, wherein conducting the driving maneuver further comprises controlling a speed of the vehicle while conducting the driving maneuver.

10. A method for a vehicle comprising:
responsive to an indication that a jet pump that functions to transfer a fuel from a passive side to an active side of a saddle fuel tank is degraded, propelling the vehicle along a route that is predicted to result in a transfer of the fuel from the passive side to the active side to enable the vehicle to reach a desired destination in lieu of the jet pump.

11. The method of claim 10, wherein the desired destination is selected by a vehicle operator under circumstances where the vehicle is not controlled autonomously.

12. The method of claim 10, wherein the desired destination is selected by a passenger under circumstances where the vehicle is controlled autonomously and where the vehicle is occupied by the passenger; and
wherein the desired destination is autonomously selected under circumstances where the vehicle is controlled autonomously and where the vehicle is unoccupied.

13. The method of claim 10, wherein the route includes one or more driving scenarios that result in a passive transfer of fuel from the passive side to the active side of the saddle fuel pump, the passive transfer of fuel comprising a quantity of fuel that is sufficient to enable the vehicle to reach the desired destination; and
wherein the route minimizes the passive transfer of fuel from the active side to the passive side of the saddle fuel pump.

14. The method of claim 13, further comprising controlling a tilting of the vehicle via an active suspension during the one or more driving scenarios to further encourage the passive transfer of fuel from the passive side to the active side.

15. The method of claim 13, wherein the one or more driving scenarios are based on a direction of centrifugal force being in a direction of the active side of the saddle fuel tank and away from the passive side of the fuel tank while the vehicle is in the process of conducting the one or more driving scenarios.

16. The method of claim 10, wherein the route does not result in the transfer of fuel from the passive side to the active side under conditions where an amount of fuel in the active side is determined to be sufficient to enable the vehicle to reach the desired destination without any transfer of fuel from the passive side to the active side.

17. The method of claim 10, wherein the route is developed via an onboard navigation system of the vehicle based on one or more of the desired destination, current levels of the fuel in the active side and the passive side of the saddle fuel tank, and computer assisted drawing(s) of the saddle fuel tank.

18. A system for a vehicle, comprising:
a saddle fuel tank for storing a fuel that includes an active side with a fuel pump that supplies the fuel from the active side to an engine for combustion, and a jet pump that transfers the fuel from a passive side of the saddle fuel tank to the active side;
an onboard navigation system;
an autonomous vehicle system; and
a controller with computer readable instructions stored on non-transitory memory that when executed, cause the controller to:
indicate degradation of the jet pump in response to a first fuel level in the active side decreasing while a second fuel level in the passive side is maintained constant under conditions where both the fuel pump and the jet pump are activated;
request from the onboard navigation system a plurality of routes and associated destinations for the vehicle, the routes specified to include one or more driving scenarios predicted to result in a transfer of the fuel from the passive side to the active side under conditions where the associated destinations are determined not able to be reached via the vehicle based on the first fuel level in the active side;
receive a selection as to a desired destination from one of the plurality of routes and associated destinations;
provide a set of instructions to enable the vehicle to be propelled along a route associated with the desired destination; and
propel the vehicle via the set of instructions along the route associated with the desired destination via the autonomous vehicle system in order to reach the desired destination.

19. The system of claim 18, wherein the controller stores further instructions to receive the selection from a passenger of the vehicle via a human machine interface under conditions where the vehicle is occupied via the passenger, or where the controller stores further instructions to select the desired destination from one of the plurality of routes and associated destinations under conditions where the vehicle is unoccupied.

20. The system of claim 18, further comprising:
an active suspension system; and
wherein the controller stores further instructions to control a tilting of the vehicle during the one or more driving scenarios via the active suspension system to encourage a greater amount of fuel transfer from the passive side to the active side as compared to not controlling the tilting of the vehicle.

* * * * *